US012600016B2

(12) United States Patent
Mueckl et al.

(10) Patent No.: US 12,600,016 B2
(45) Date of Patent: Apr. 14, 2026

(54) DEPTH AND ANGLE SENSOR ATTACHMENT FOR A POWER TOOL

(71) Applicant: MILWAUKEE ELECTRIC TOOL CORPORATION, Brookfield, WI (US)

(72) Inventors: Gareth Mueckl, Milwaukee, WI (US); Tauhira Hoossainy, Milwaukee, WI (US); Leo Mikat-Stevens, Glendale, WI (US); Logan Blair, Wheaton, IL (US); Jake McDermott, Tinley Park, IL (US); Jonathon R. Nord, Bloomington, IL (US); Jared Shurtleff, Elburn, IL (US); Joshua Kundinger, Wauwatosa, WI (US); John von Helms, Jr., Ingleside, IL (US); Nicholas Dobernig, West Allis, WI (US); Matthew Post, Milwaukee, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

(21) Appl. No.: 18/541,756

(22) Filed: Dec. 15, 2023

(65) Prior Publication Data

US 2024/0116156 A1 Apr. 11, 2024

Related U.S. Application Data

(63) Continuation of application No. 17/038,637, filed on Sep. 30, 2020, now Pat. No. 11,845,163, which is a
(Continued)

(51) Int. Cl.
B25B 21/00 (2006.01)
B25B 23/00 (2006.01)
(Continued)

(52) U.S. Cl.
CPC .............. *B25B 21/00* (2013.01); *B25B 23/00* (2013.01); *B25F 5/00* (2013.01); *G01B 11/14* (2013.01); *G01B 11/26* (2013.01); *G01S 15/42* (2013.01)

(58) Field of Classification Search
CPC ......... B25B 21/00; B25B 23/00; G01B 11/14; G01B 11/26; B25F 5/00; G01S 15/42
See application file for complete search history.

(56) References Cited

U.S. PATENT DOCUMENTS 4,113,404 A 9/1978 Lippacher et al.
4,644,335 A 2/1987 Wen
(Continued)

FOREIGN PATENT DOCUMENTS

CN 201381467 1/2010
CN 202304773 7/2012
(Continued)

OTHER PUBLICATIONS

Chinese Patent Office Second Office Action for Application No. 201710849274.1 dated Dec. 31, 2019 (15 pages including English translation).
(Continued)

*Primary Examiner* — Stephen F. Gerrity
*Assistant Examiner* — Nicholas E Igbokwe
(74) *Attorney, Agent, or Firm* — Michael Best & Friedrich LLP

(57) ABSTRACT

A power tool including a sensor attachment, a housing, a motor, and a power tool controller. The power tool controller is operable or configured to control power provided to the motor. The sensor attachment is coupled to the power tool's housing and includes a first non-contact sensor and a sensor controller. The sensor controller receives signals from the first non-contact sensor related to distance to a work surface
(Continued)

and determines a fastener depth based on the signals from the first non-contact sensor. If the fastener depth is greater than or equal to a desired fastener depth, the sensor controller generates and sends a control signal to the power tool controller. In response, the power tool controller turns off or cuts power to the motor.

13 Claims, 27 Drawing Sheets

Related U.S. Application Data continuation of application No. 15/693,752, filed on Sep. 1, 2017, now Pat. No. 10,807,219.

(60) Provisional application No. 62/384,374, filed on Sep. 7, 2016.

(51) Int. Cl.
| | |
|---|---|
| *B25F 5/00* | (2006.01) |
| *G01B 11/14* | (2006.01) |
| *G01B 11/26* | (2006.01) |
| *G01S 15/42* | (2006.01) |

(56) References Cited

U.S. PATENT DOCUMENTS

| | | | | |
|---|---|---|---|---|
| 5,484,026 | A * | 1/1996 | Susaki | B25B 21/00 |
| | | | | 173/11 |
| 5,562,240 | A * | 10/1996 | Campbell | B25C 1/04 |
| | | | | 173/20 |
| 6,536,536 | B1 * | 3/2003 | Gass | B23B 31/123 |
| | | | | 173/171 |
| 6,587,184 | B2 * | 7/2003 | Wursch | B23B 49/008 |
| | | | | 356/139.03 |
| 6,851,487 | B1 * | 2/2005 | Shotey | B25F 5/00 |
| | | | | 173/1 |
| 8,517,642 | B2 | 8/2013 | Borunda | |
| 2001/0053313 | A1 * | 12/2001 | Luebke | B25F 5/00 |
| | | | | 408/16 |

| | | | | |
|---|---|---|---|---|
| 2002/0162978 | A1 * | 11/2002 | Butler | B23D 59/002 |
| | | | | 250/559.33 |
| 2003/0218469 | A1 | 11/2003 | Brazell et al. | |
| 2005/0169717 | A1 | 8/2005 | Field | |
| 2005/0205274 | A1 * | 9/2005 | Bogue | B25B 21/00 |
| | | | | 173/2 |
| 2005/0261870 | A1 * | 11/2005 | Cramer | B23B 49/008 |
| | | | | 702/166 |
| 2007/0035311 | A1 | 2/2007 | Wuersch | |
| 2010/0202846 | A1 | 8/2010 | Borunda | |
| 2012/0267472 | A1 | 10/2012 | Pratzovnick et al. | |
| 2013/0028674 | A1 * | 1/2013 | Okubo | B23B 49/00 |
| | | | | 408/16 |
| 2013/0098646 | A1 | 4/2013 | Funabashi et al. | |
| 2015/0091782 | A1 | 4/2015 | Yamazaki et al. | |
| 2016/0088482 | A1 | 3/2016 | Zeiler et al. | |
| 2016/0167186 | A1 * | 6/2016 | Chan | G05B 19/4185 |
| | | | | 173/2 |
| 2016/0178398 | A1 * | 6/2016 | Krapf | B25F 5/00 |
| | | | | 429/90 |
| 2017/0057040 | A1 * | 3/2017 | Rzasa | B25F 5/00 |

FOREIGN PATENT DOCUMENTS

| | | | | |
|---|---|---|---|---|
| CN | 103341654 | 10/2013 | | |
| CN | 204154291 | 2/2015 | | |
| DE | 102008000198 | 8/2009 | | |
| DE | 102008000198 A1 * | 8/2009 | | B25F 5/00 |
| EP | 1036635 | 9/2000 | | |
| JP | 2002205285 | 7/2002 | | |
| JP | 2012171068 | 9/2012 | | |
| WO | 03061915 | 7/2003 | | |
| WO | 2009095107 | 8/2009 | | |
| WO | 2011089766 | 7/2011 | | |
| WO | 2015106304 | 7/2015 | | |

OTHER PUBLICATIONS

Chinese Patent Office Action for Application No. 201710849274.1 dated May 27, 2019 (15 pages including English translation).
Taiwan Patent Office Search Report for Application No. 106130438 dated Mar. 27, 2016 (2 pages).
European Patent Office Search Report for Application No. 17189943.8 dated Feb. 15, 2018 (11 pages).

* cited by examiner

*FIG. 15A*

DEPTH AND ANGLE SENSOR ATTACHMENT FOR A POWER TOOL

RELATED APPLICATIONS

This application is a continuation of U.S. patent application Ser. No. 17/038,637, filed Sep. 30, 2020, which is a continuation of U.S. patent application Ser. No. 15/693,752, filed Sep. 1, 2017, which claims priority to U.S. Provisional Patent Application No. 62/384,374, filed Sep. 7, 2016, the entire content of each of which is hereby incorporated by reference.

FIELD OF THE INVENTION

This invention relates to controlling the operation of a power tool.

SUMMARY

Current depth monitoring systems include adjustable metal rods that contact a work surface once a desired depth has been reached. Such depth monitoring systems provide inconsistent depth monitoring results due to vibrations and difficulty of use. Additionally, the adjustable metal rod depth monitoring system relies on contact with a surface. As a result of this contact, the rod can mar the working surface with undesirable holes or indentations from the metal rod.

This invention provides a non-contact distance measuring or sensing device that controls a power tool (e.g., shuts the power tool motor off) when a desired depth for a fastener has been reached. The sensing device includes, for example, one or more distance sensors for measuring the distance of the sensing device to a work surface in a non-contact manner. Fastener depth and power tool alignment can be determined based on the distance measurements.

In one embodiment, the invention provides a power tool including a power tool housing, a motor within the power tool housing, a power tool controller, and a sensor attachment. The power tool controller is configured to control power provided to the motor. The sensor attachment is configured to be physically coupled to the power tool housing. The sensor attachment includes a non-contact sensor and a sensor controller. The sensor controller is configured to receive a signal from the non-contact sensor related to a distance to a work surface, determine a depth of a fastener based on the signal received from the non-contact sensor, and generate a control signal if the depth of the fastener is greater than or equal to a desired fastener depth. The control signal is operable to cause power to the motor to be turned off.

In another embodiment, the invention provides a sensor attachment for a power tool. The power tool includes a motor. The sensor attachment includes a non-contact sensor and a sensor controller. The sensor controller is configured to receive a signal from the non-contact sensor related to a distance to a work surface, determine a depth of a fastener based on the signal received from the non-contact sensor, and generate a control signal if the depth of the fastener is greater than or equal to a desired fastener depth. The control signal is operable to cause power to the motor to be turned off.

In another embodiment, the invention provides a power tool that includes a power tool housing, a motor within the power tool housing, a sensor attachment, and a controller. The sensor attachment is configured to be physically coupled to the power tool housing. The sensor attachment includes a non-contact sensor and a controller. The controller is configured to receive a signal from the non-contact sensor related to a distance to a work surface, determine a depth of a fastener based on the signal received from the non-contact sensor, and generate a control signal if the depth of the fastener is greater than or equal to a desired fastener depth. The control signal is operable to cause power to the motor to be turned off.

In another embodiment, the invention provides a method of controlling a power tool. The power tool includes a controller, a motor within a power tool housing, and a sensor attachment physically coupled to the power tool housing. The method includes receiving, at the controller, a signal from a non-contact sensor of the sensor attachment, determining, using the controller, a depth of a fastener based on the signal received from the non-contact sensor, and generating, using the controller, a control signal if the depth of the fastener is greater than or equal to a desired fastener depth. The control signal is operable to cause power to the motor to be turned off.

Before any embodiments of the invention are explained in detail, it is to be understood that the invention is not limited in its application to the details of the configuration and arrangement of components set forth in the following description or illustrated in the accompanying drawings. The invention is capable of other embodiments and of being practiced or of being carried out in various ways. Also, it is to be understood that the phraseology and terminology used herein are for the purpose of description and should not be regarded as limiting. The use of "including," "comprising," or "having" and variations thereof herein are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

In addition, it should be understood that embodiments of the invention may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (e.g., stored on non-transitory computer-readable medium) executable by one or more processing units, such as a microprocessor and/or application specific integrated circuits ("ASICs"). As such, it should be noted that a plurality of hardware and software based devices, as well as a plurality of different structural components may be utilized to implement the invention. For example, "servers" and "computing devices" described in the specification can include one or more processing units, one or more computer-readable medium modules, one or more input/output interfaces, and various connections (e.g., a system bus) connecting the components.

Other aspects of the invention will become apparent by consideration of the detailed description and accompanying drawings.

BRIEF DESCRIPTION OF THE DRAWINGS

FIG. 15A illustrates a control system for the depth/angle sensor attachment of FIGS. 5-10 according to an embodiment of the invention.

DETAILED DESCRIPTION

The invention described herein relates to a power tool and a sensor attachment for the power tool that provides non-contact fastener depth and/or power tool alignment determinations. Based on the determined fastener depth and/or power tool alignment, a motor within the power tool can be shut off. The fastener depth and power tool alignment are determined based on non-contact distance measurements between the sensor attachment and a work surface. Non-contact distance measurements eliminate the inconsistency and inaccuracy of mechanical distance detection systems. The sensor attachment includes a sensor controller that determines fastener depth and/or power tool alignment based on signals received from the sensor or sensors in the sensor attachment. As the distance between the sensor attachment and the work surface becomes smaller, the depth of the fastener becomes greater. If the sensor controller determines that the power tool is misaligned, the sensor controller generates an output signal to alert a user of the misalignment. If the sensor controller determines that the fastener depth is greater than or equal to a desired fastener depth (e.g., a user defined fastener depth), the sensor controller generates and sends a signal to the power tool to shut off the power tool's motor. The sensor attachment can include, for example, ultrasonic distance sensors, laser distance sensors, or another suitable non-contact distance measuring device for determining a distance between the sensor attachment and the work surface. The sensor attachment can mechanically, electrically, and communicatively connect to the power tool such that power from a power tool battery pack is used to power the sensor attachment, and the sensor controller can provide control signals to the power tool.

Figure 1:
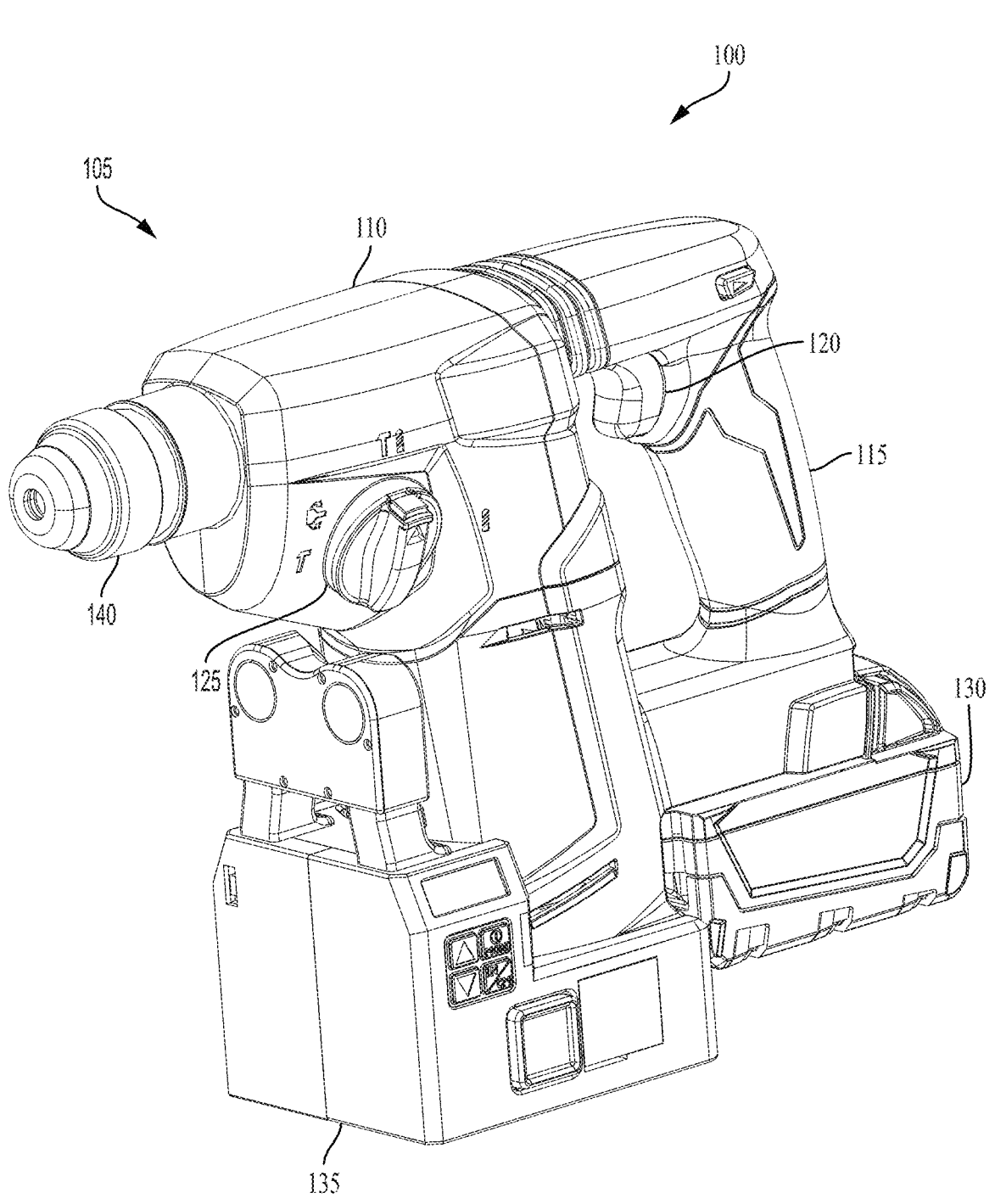
FIGS. 1-4 illustrate a power tool including a depth/angle sensor attachment according to an embodiment of the invention.
Figure 2:
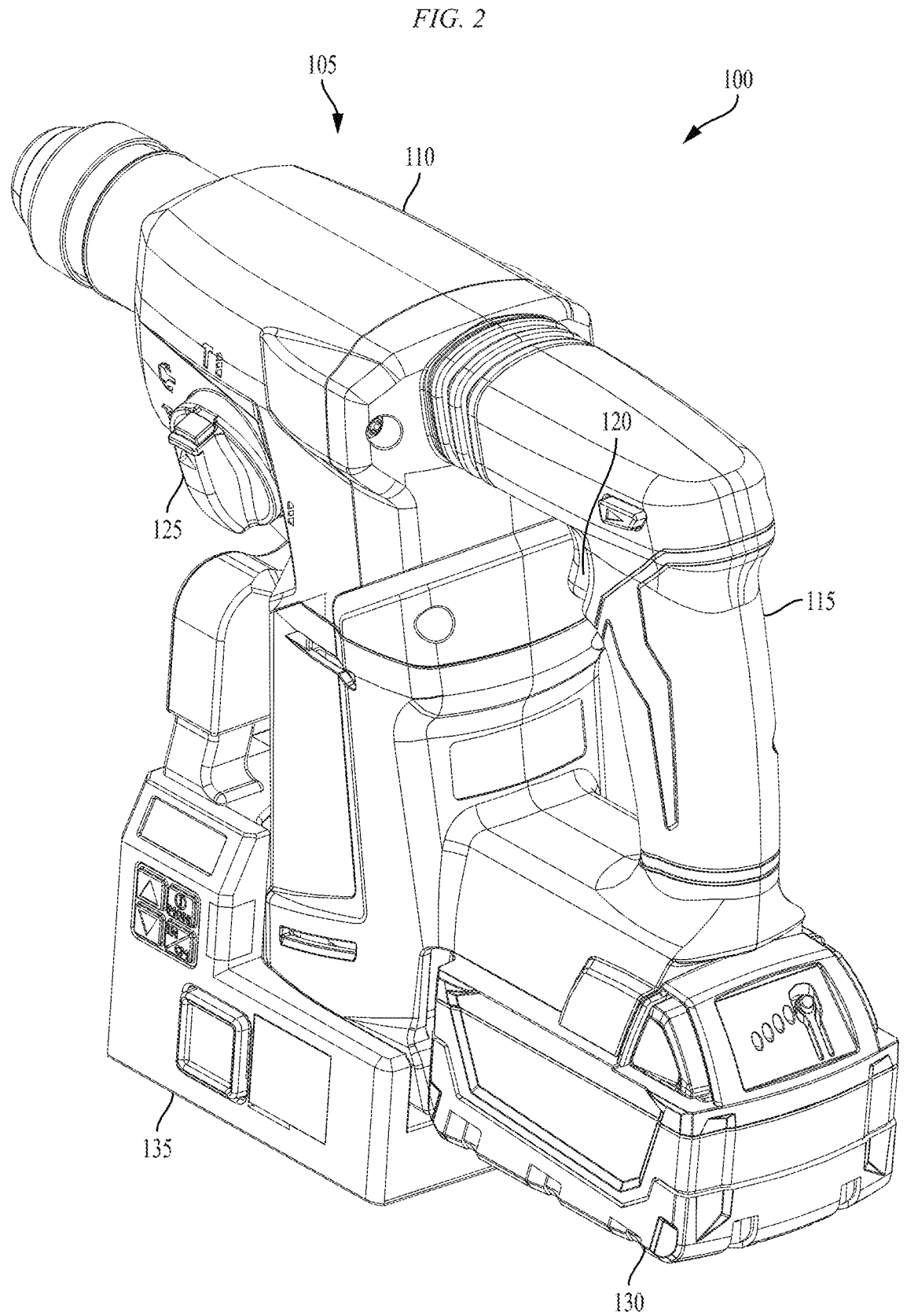
Figure 3:
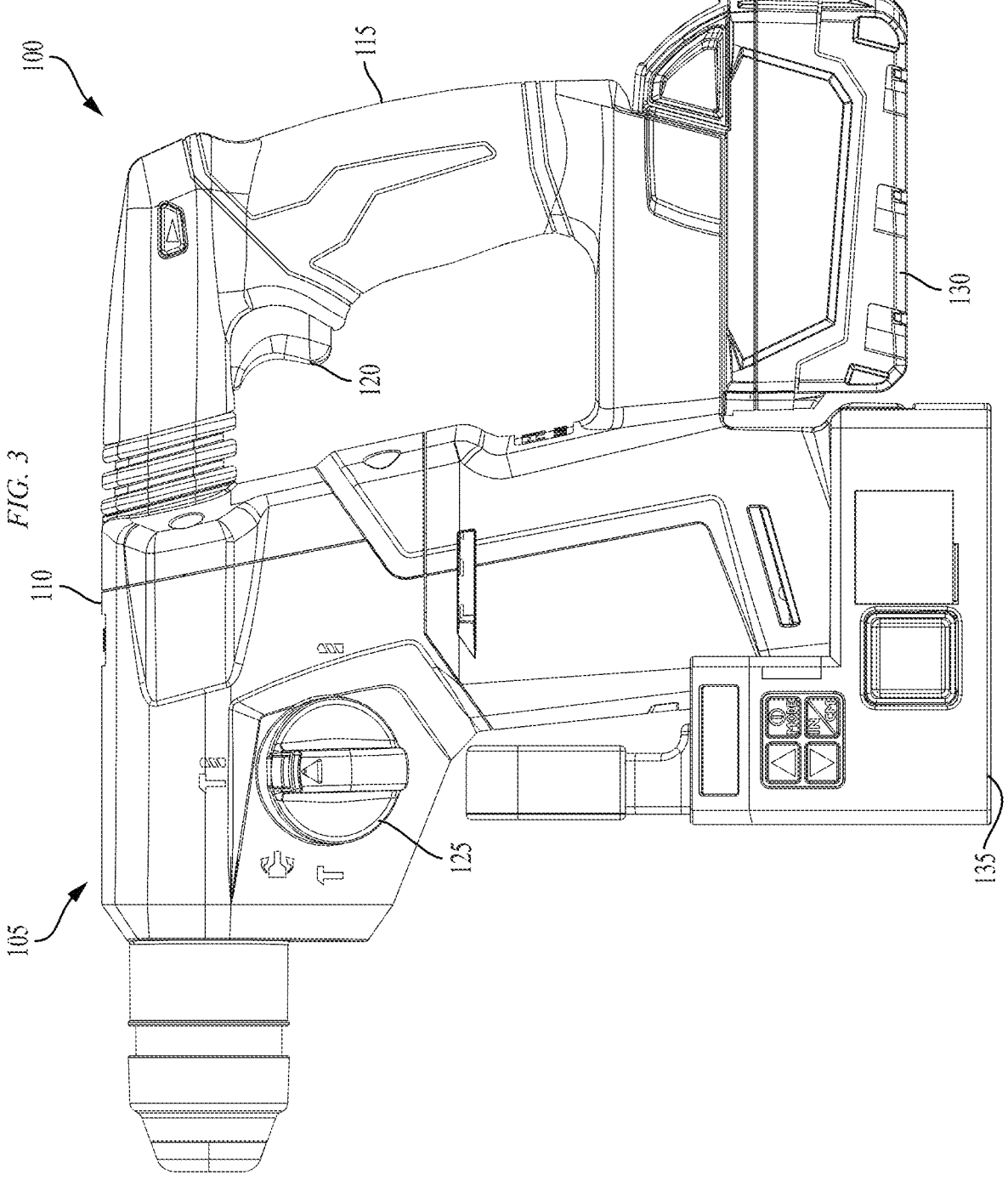
Figure 4:
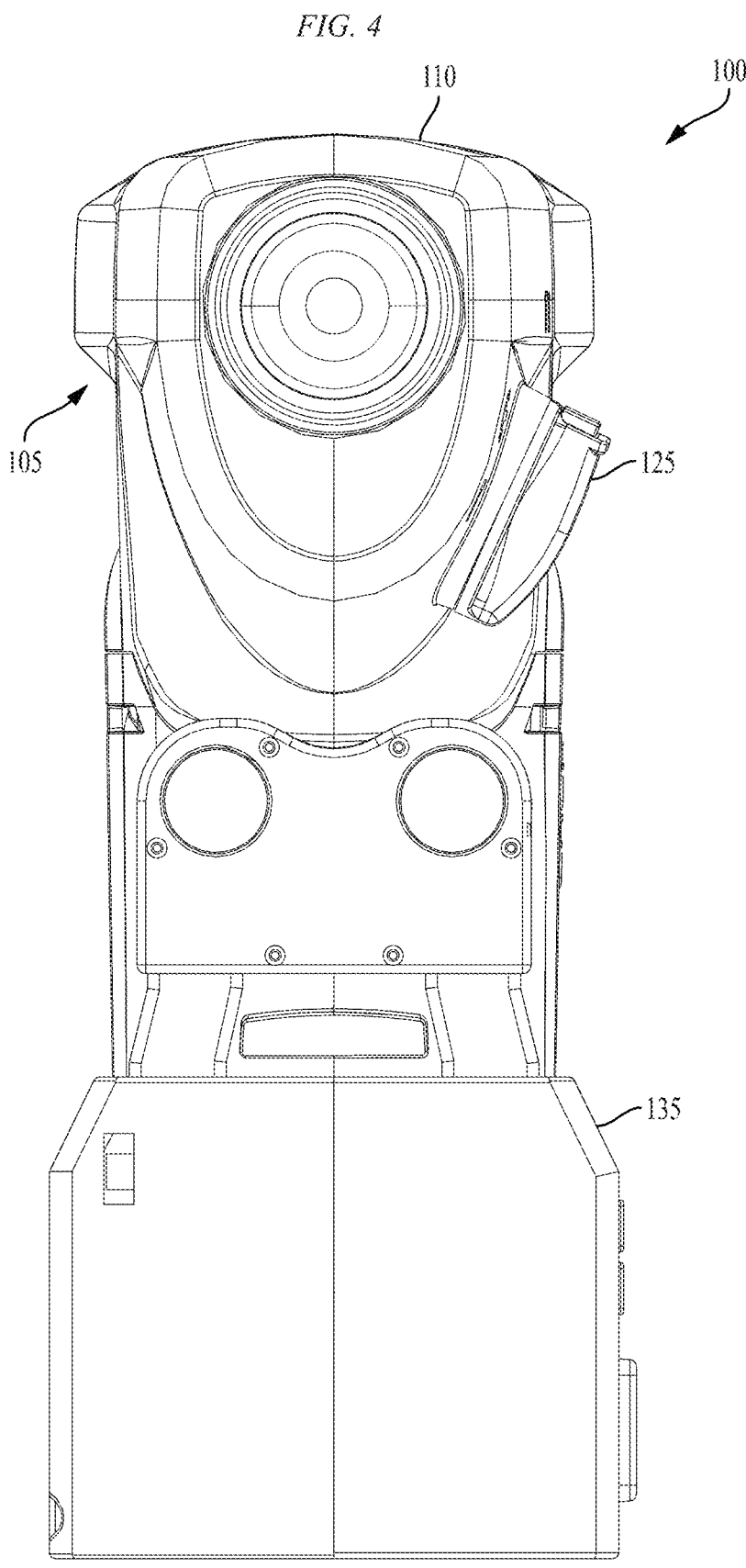
Figure 5:
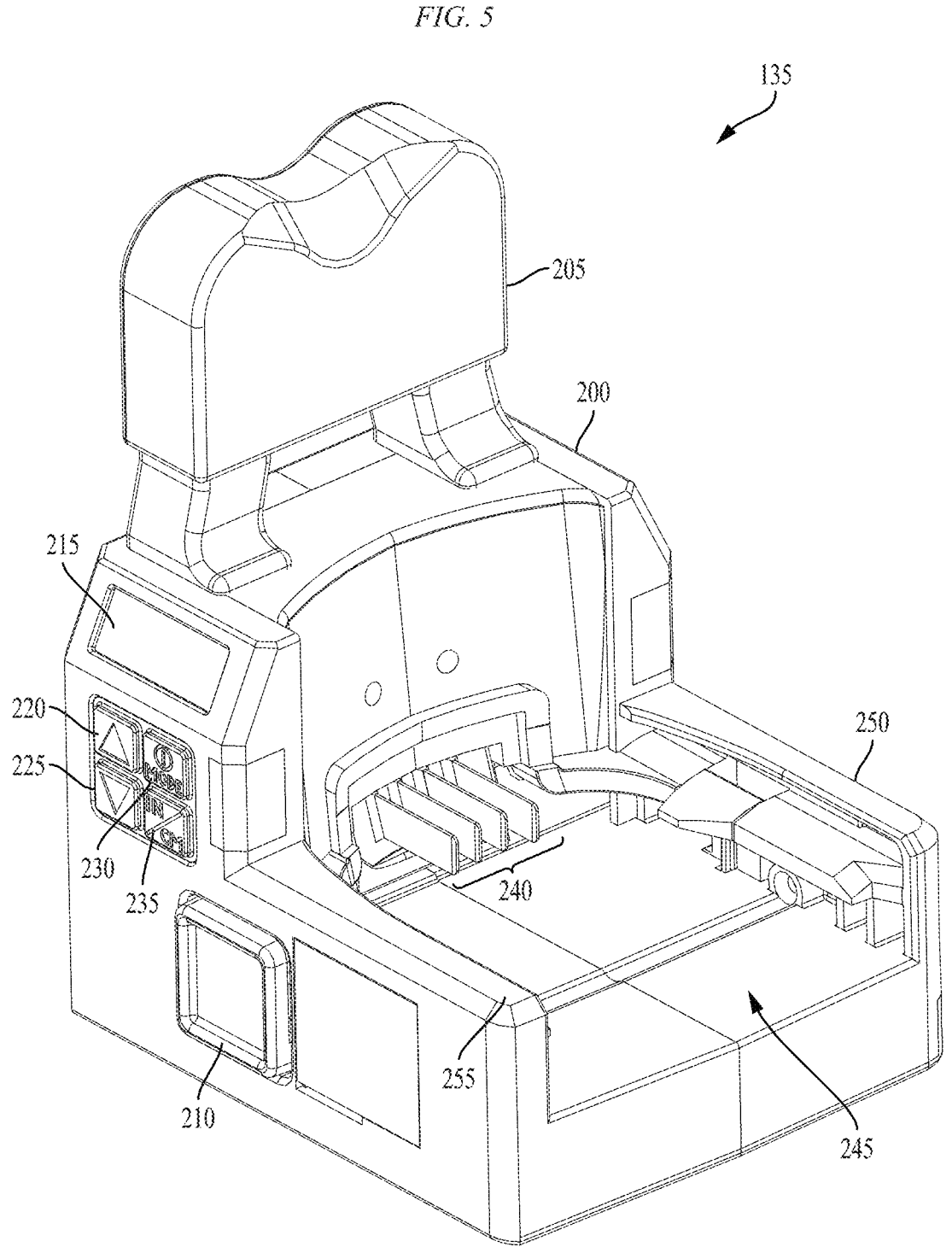
FIGS. 5-10 illustrate a depth/angle sensor attachment for the power tool of FIGS. 1-4 according to an embodiment of the invention.
Figure 6:
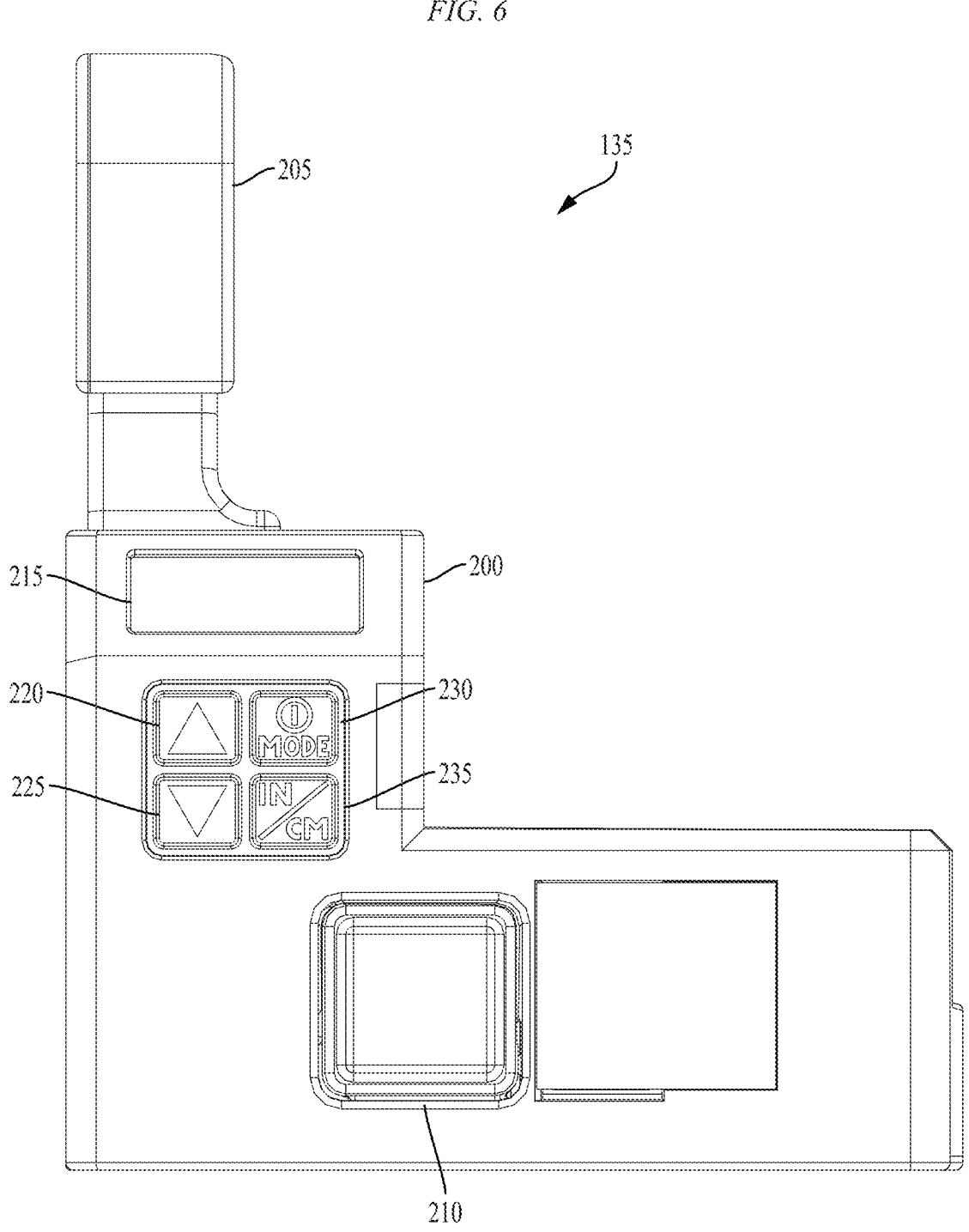
Figure 7:
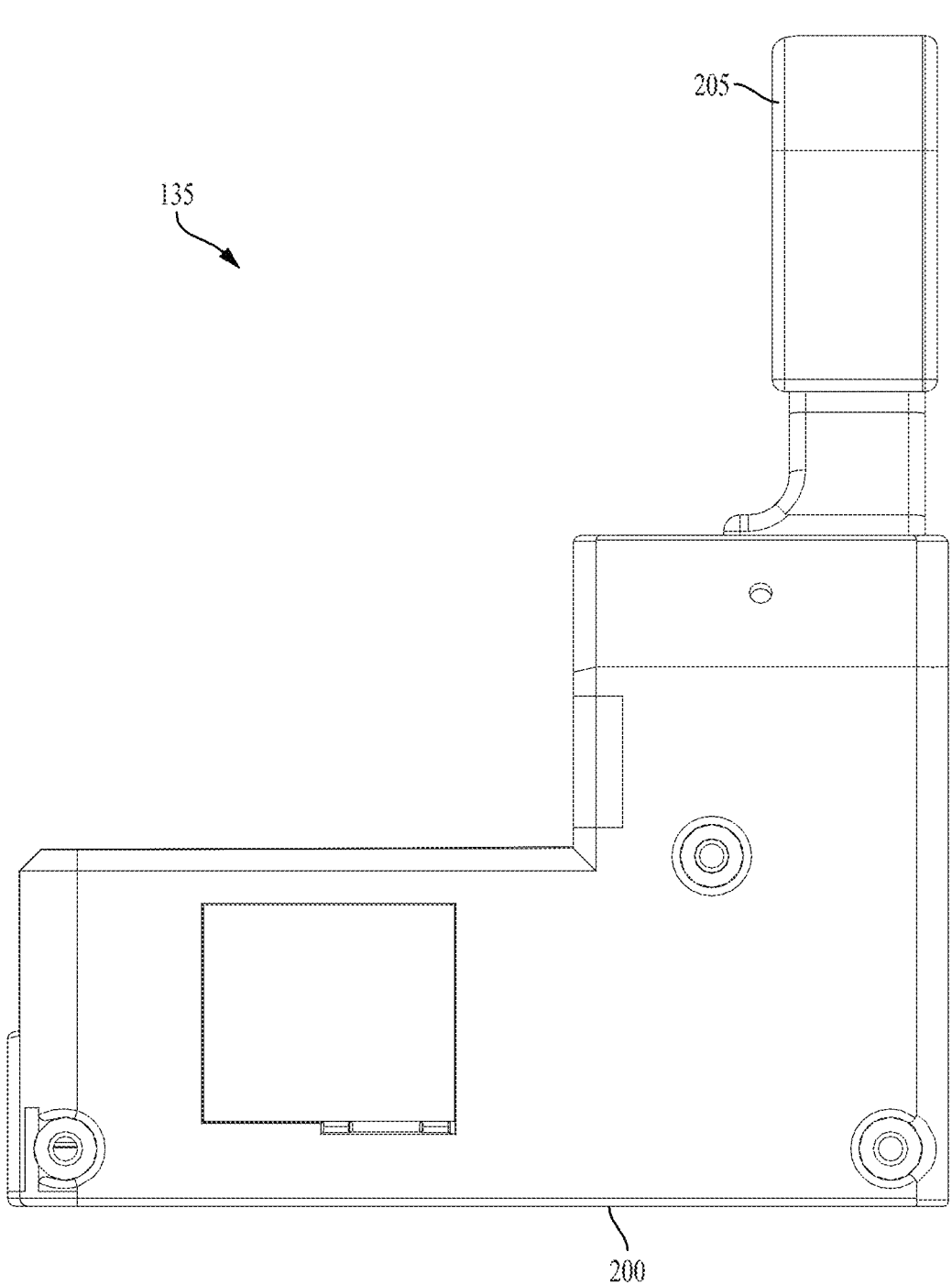
Figure 8:
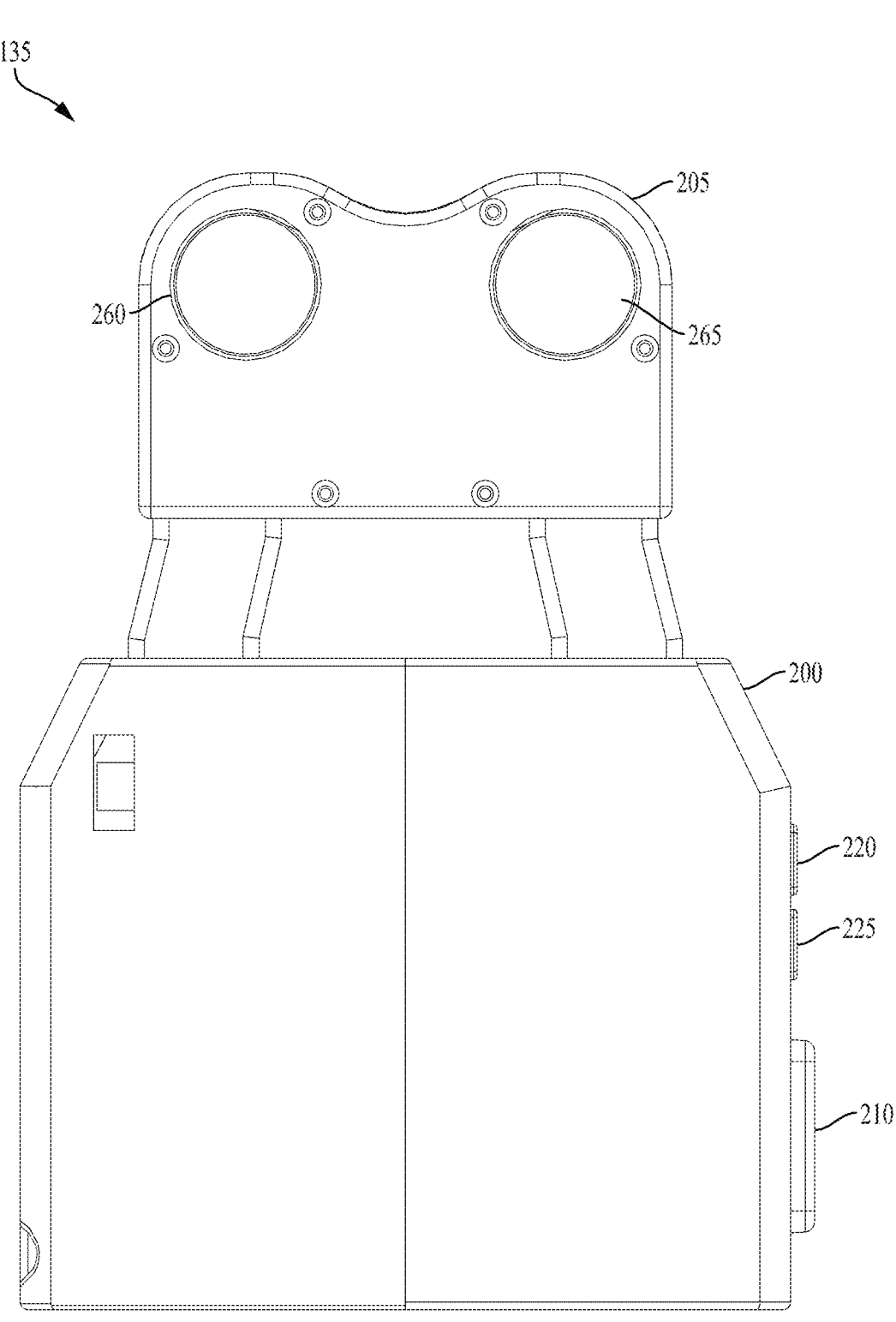
Figure 9:
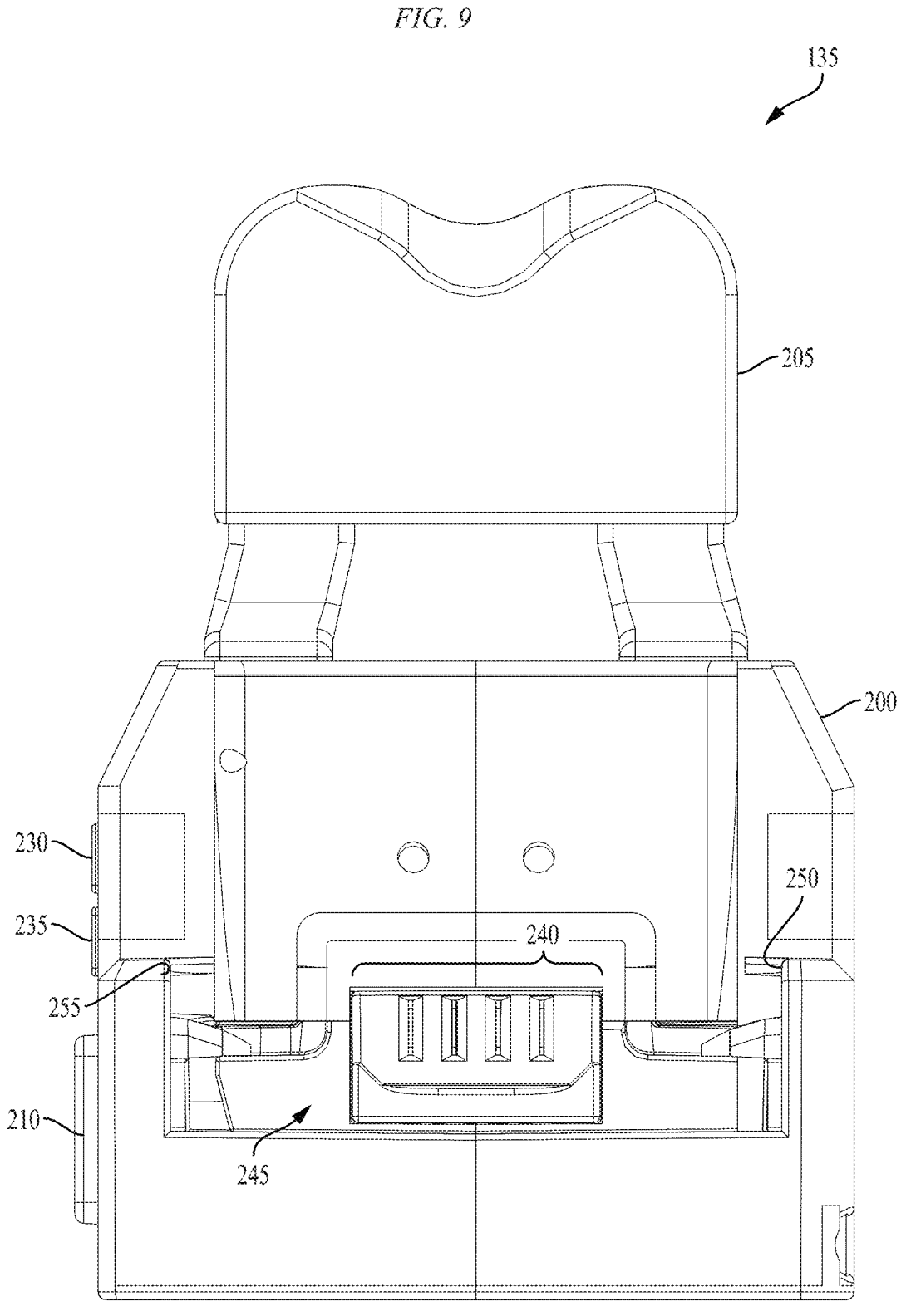
Figure 10:
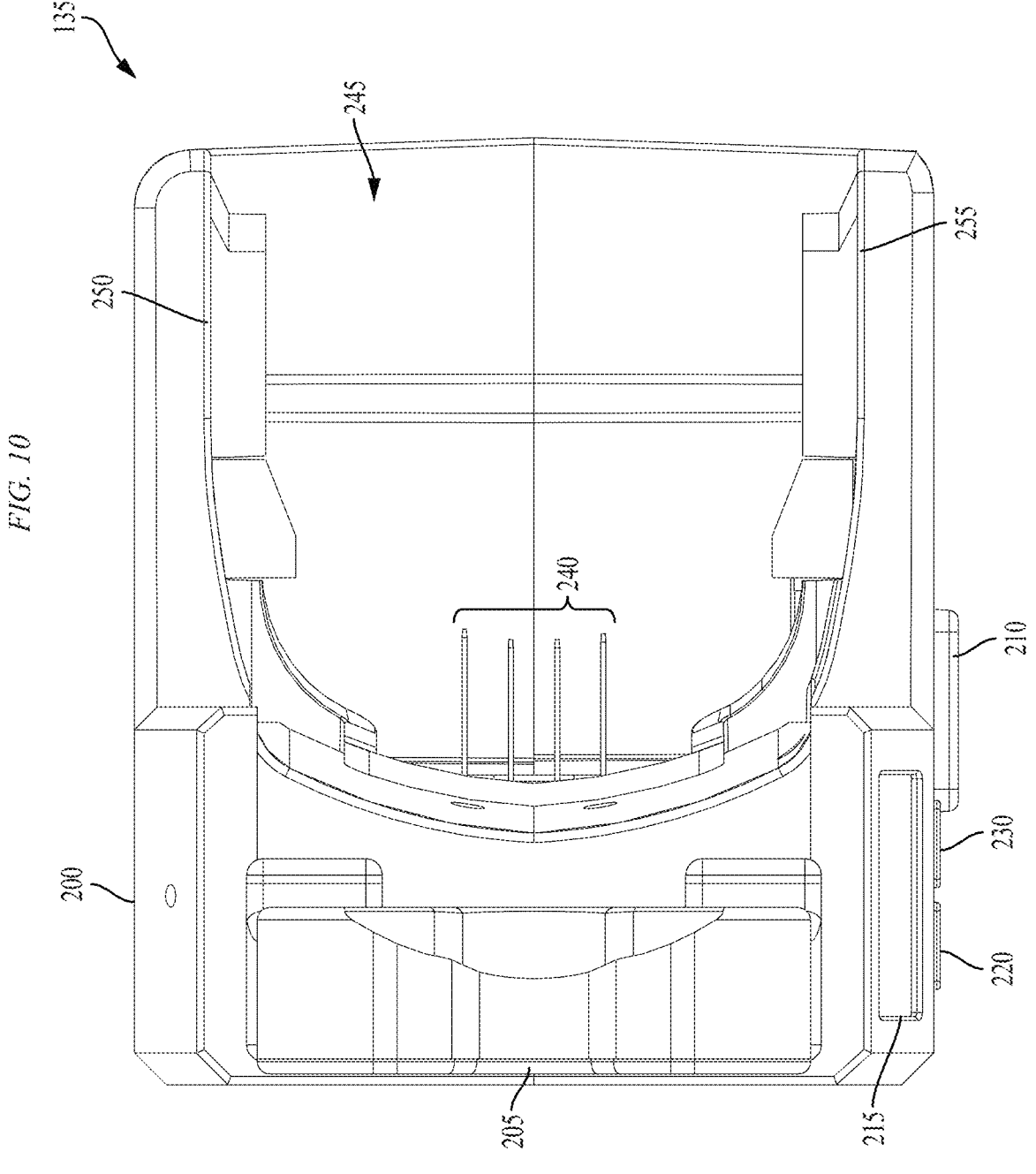

FIGS. 1-4 illustrate a power tool 100 that includes a housing 105. The housing 105 includes an upper housing 110 and a handle portion 115. A trigger 120 is operable to control power supplied to a motor within the power tool 100, and a selection device 125 allows a user to select different operational modes of the power tool 100 (e.g., rotation only, hammering only, rotary hammering, etc.). A battery pack 130 provides power to the power tool 100 and a depth/angle sensor attachment 135 (via the power tool 100). The power tool 100 also includes an output device (e.g., a release collar and bit holder) for performing an operation (e.g., hammering, drilling, etc.). The power tool 100 illustrated in FIG. 1 is a rotary hammer (e.g., for drilling into brick, concrete, and other structural building materials). However, the invention is similarly applicable to other power tools, such as drill/drivers, hammer drills, impact drivers, impact wrenches, etc.

The depth/angle sensor attachment 135 is illustrated in greater detail in FIGS. 5-10. The depth/angle sensor attachment 135 includes a primary housing 200, a sensor housing 205, a release button 210 (for mechanically releasing the sensor attachment 135 from the power tool 100), a display 215 (e.g., an LED display, an LCD, etc.), an UP button 220 for increasing a desired fastener depth, a DOWN button 225 for decreasing a desired fastener depth, a MODE selection button 230, a UNITS selection button 235, power and communication terminals 240, a power tool interface 245, and rails 250, 255 for slidably attaching to the power tool 100. A user uses the UP and DOWN buttons 220, 225 to adjust a desired depth setting for the power tool 100. For example, when the power tool 100 has sunk a fastener to the user's desired depth, the depth/angle sensor attachment 135 sends a signal to the power tool 100 to turn off a motor. The MODE selection button 230 allows a user to select between, for example, a depth only mode and a depth and alignment mode. In the depth mode, the depth/angle sensor attachment 135 only monitors for the depth of a fastener. In the depth and alignment mode, the depth/angle sensor attachment 135 monitors for the depth of a fastener as well as the alignment of the power tool 100 (e.g., compared to an alignment of the power tool 100 at the beginning of a fastening operation). The UNITS button 235 allows a user to select between metric units (e.g., centimeters) and imperial units (e.g., inches) for selecting and indicating the depth of a fastener. The display 215 is operable or configured to provide an indication to a user of, for example, a current depth of a fastener, a desired depth for a fastener, power tool misalignment, etc. The indications on the display 215 can be numeric, graphical (e.g., dot on a grid to show alignment), or visual (e.g., illumination of LED array or LCD to illustrate alignment of the power tool). The sensor housing 205 includes a first sensor 260 and a first emitter 265. In some embodiments, two or more sensors (e.g., three sensors) are included in the sensor housing 205 (e.g., arranged in a triangular pattern around the first emitter 265). The first sensor 260 and the first emitter 265 form, for example, an ultrasonic distance sensor. Ultrasonic distance sensors send ultrasonic wavelength pulses out (using the emitter) and receive reflections (by the sensor) of those pulses off of surfaces. The time it takes to receive the reflection can be used to calculate distance as well as angles with respect to a surface. In some embodiments, the first sensor 260 and the first emitter 265 form a laser distance sensor, an infrared sensor, or another non-contact sensor that can be used to accurately determine a distance between two objects. In embodiments of the invention that include two or more sensors, distance measurements can be averaged and/or used individually to determine the distance between the sensor attachment 135 and the work surface.

Figure 11:
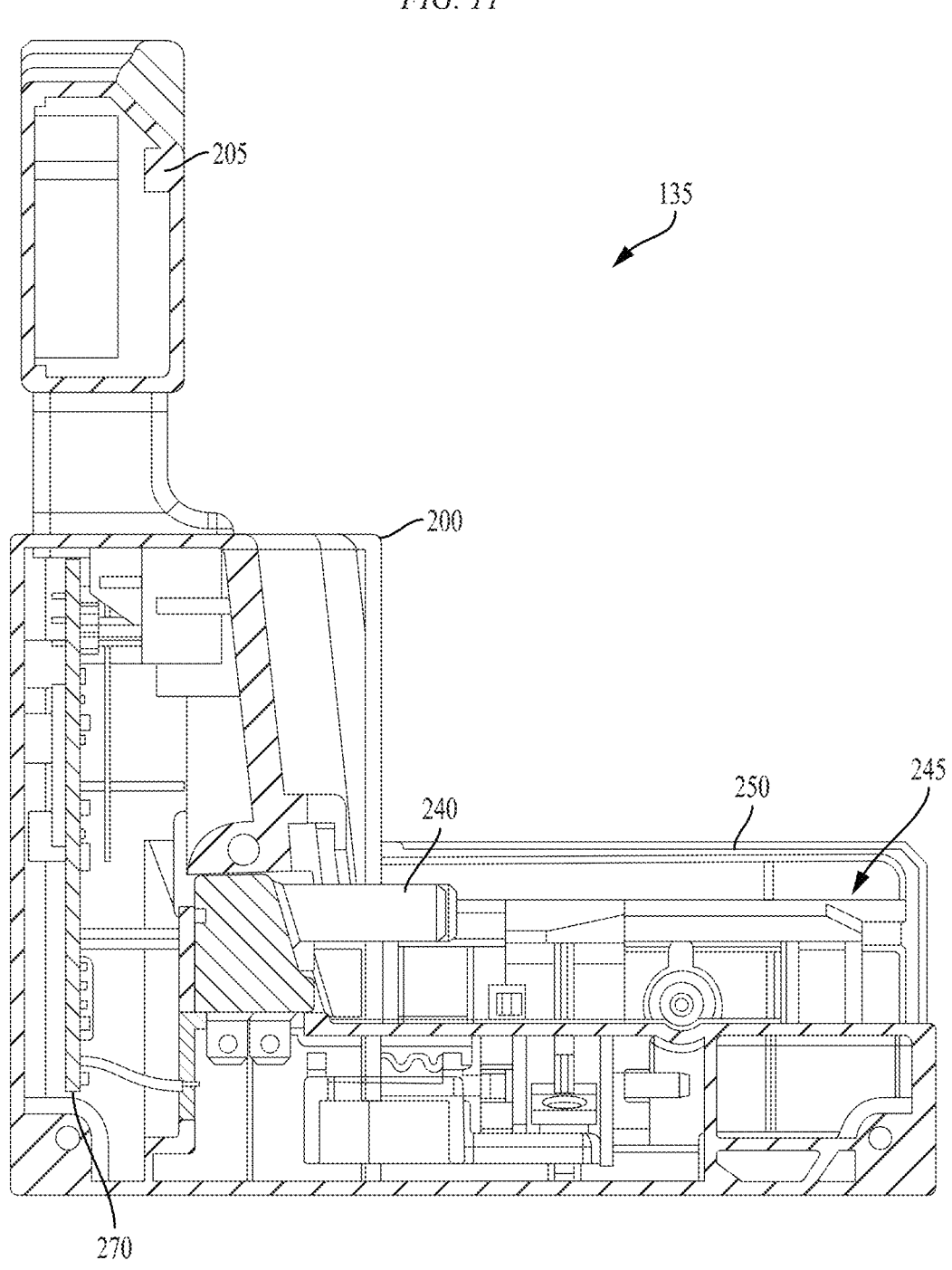
FIG. 11 illustrates a cross-sectional view of the depth/angle sensor attachment of FIGS. 5-10 according to an embodiment of the invention.

FIG. 11 is a cross-sectional view of the depth/angle sensor attachment 135 that illustrates a printed circuit board ("PCB") 270 within the depth/angle sensor attachment 135. The PCB 270 is described in greater detail below with respect to FIG. 15A. However, the PCB 270 is generally operable to receive signals from the first sensor 260, receive power from the battery pack 130 through the terminals 240, receive user input through the buttons 220, 225, 230, and 235, generate a display or indication for the user on the display 215, and provide control signals to the power tool 100 over the terminals 240 (e.g., over a communication terminal) for controlling the operation of the power tool 100.

Figure 12:
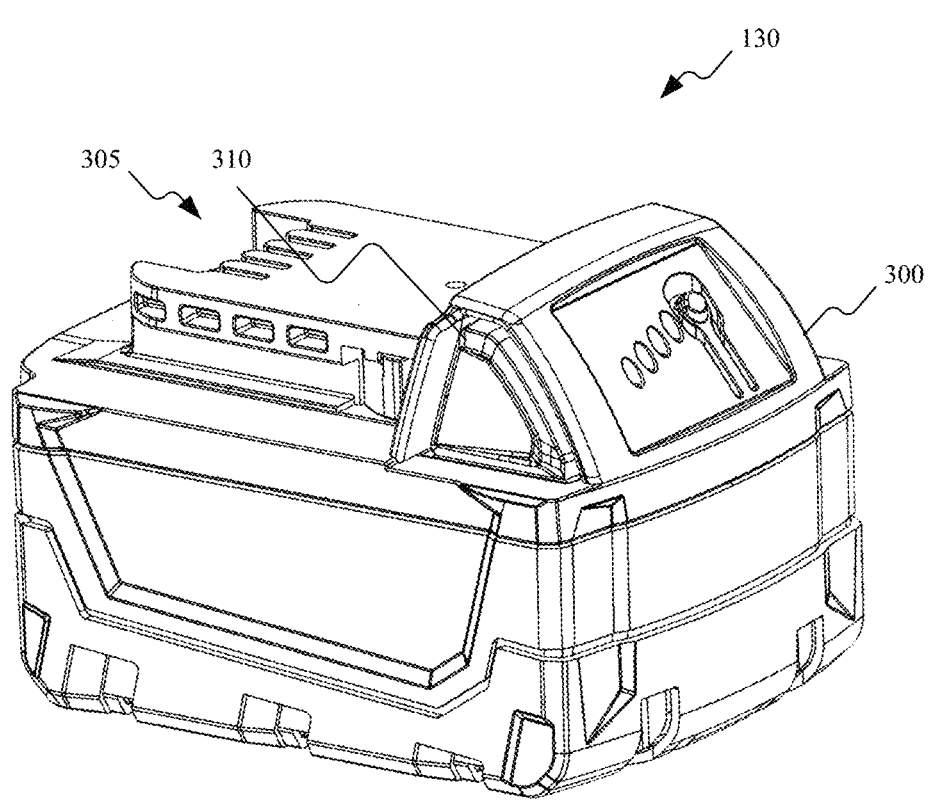
FIGS. 12-13 illustrate a battery pack for the power tool of FIGS. 1-4 according to an embodiment of the invention.
Figure 13:
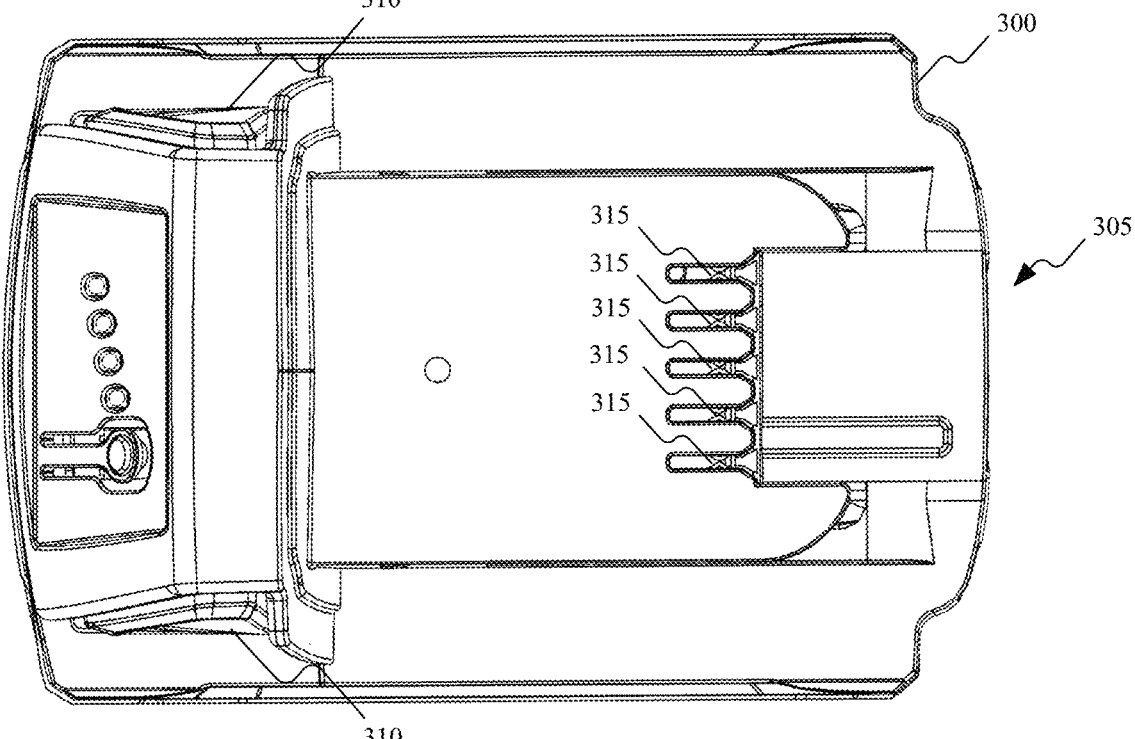

The power tool 100 described above receives power (i.e., voltage and current) from the battery pack 130 illustrated in FIGS. 12-13. The battery pack 130 is connectable to and supportable by the power tool 100. The battery pack 130 includes a housing 300 and at least one rechargeable battery cell supported by the housing 300. The battery pack 130 also includes a support portion 305 for supporting the battery pack 130 on, and coupling the battery pack 130 to, the power tool 100. The battery pack 130 also includes a coupling mechanism 310 for selectively coupling the battery pack 130 to, or releasing the battery pack 130 from, the power tool 100. In the illustrated embodiment, the support portion 305 is connectable to a complementary support portion on the power tool 100 (e.g., a battery pack interface).

The battery pack 130 includes a plurality of terminals 315 within the support portion 305 operable to electrically connect to battery cells within the battery pack 130. The plurality of terminals 315 includes, for example, a positive battery terminal, a ground terminal, and a sense terminal. The battery pack 130 is removably and interchangeably connected to the power tool 100 to provide operational power to the power tool 100. The terminals 315 are configured to mate with corresponding power terminals extending from the power tool 100 (e.g., within a battery pack interface). The battery pack 130 substantially encloses and covers the terminals on the power tool 100 when the battery pack 130 is connected to the battery pack interface. That is, the battery pack 130 functions as a cover for the opening and terminals of the power tool 100. Once the battery pack 130 is disconnected from the power tool 100, the terminals on the power tool 100 are generally exposed to the surrounding environment. The battery cells within the battery pack 130 are lithium-based battery cells having a chemistry of, for example, lithium-cobalt ("Li—Co"), lithium-manganese ("Li—Mn"), Li—Mn spinel, or another suitable lithium or lithium-based chemistry.

Figure 14:
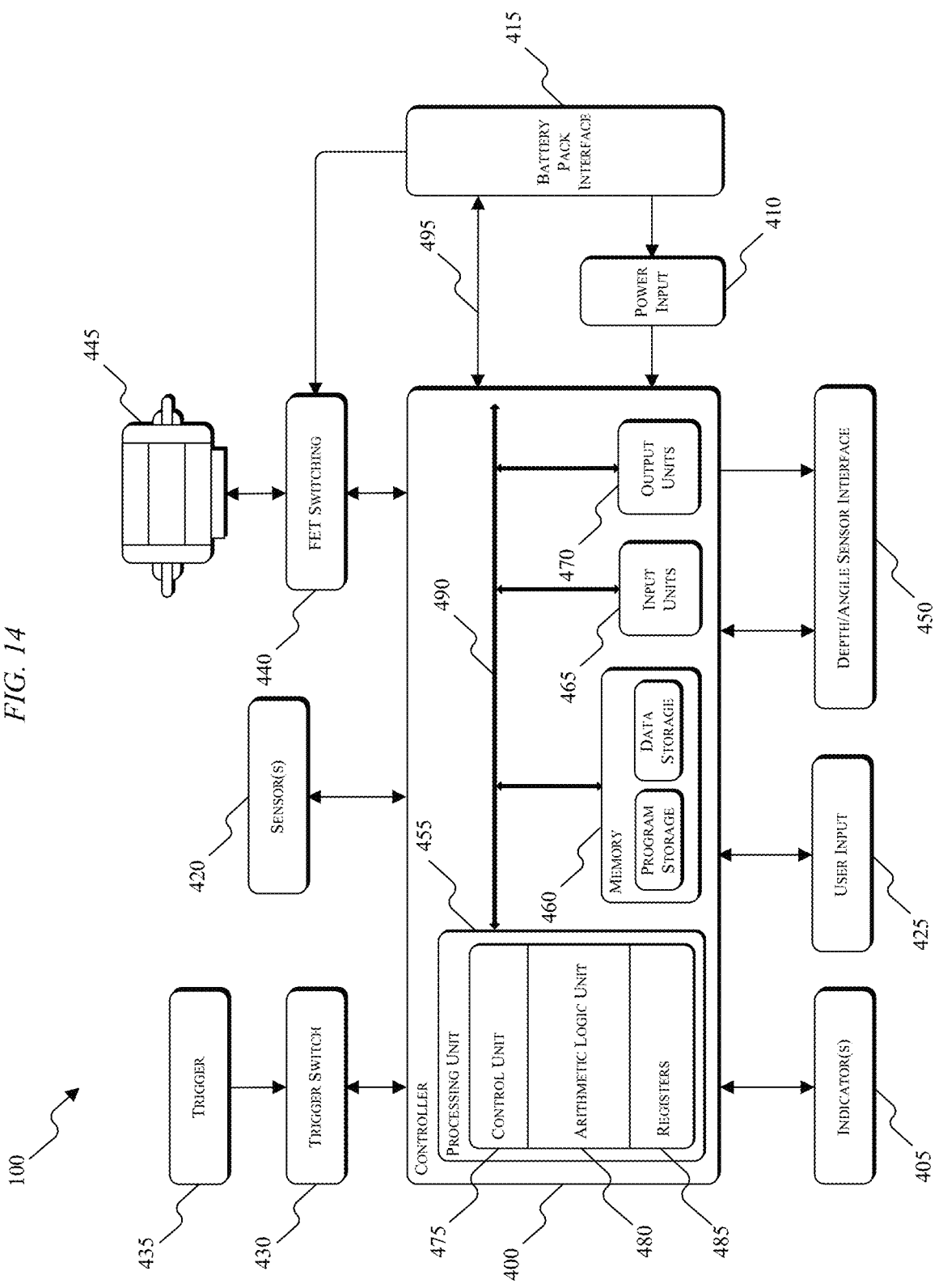
FIG. 14 illustrates a control system for the power tool of FIGS. 1-4 according to an embodiment of the invention.

The power provided by the battery pack 130 to the power tool 100 is controlled, monitored, and regulated using control electronics within the power tool 100, as illustrated in the electromechanical diagram of FIG. 14. In some embodiments, the control electronics are included in the battery pack 130. FIG. 14 illustrates a controller 400 associated with the power tool 100. The controller 400 is electrically and/or communicatively connected to a variety of modules or components of the power tool 100. For example, the illustrated controller 400 is connected to one or more indicators 405, a power input module 410, a battery pack interface 415, one or more sensors 420, a user input module 425, a trigger switch 430 (connected to trigger 435), and a FET switching module 440 (e.g., including one or more switching FETs). In some embodiments, the trigger switch 430 is combined and integral with the controller 400 within the power tool 100.

The controller 400 includes combinations of hardware and software that are operable to, among other things, control the operation of the power tool 100, activate the one or more indicators 405 (e.g., an LED), monitor the operation of the power tool 100, etc.

In some embodiments, the controller 400 includes a plurality of electrical and electronic components that provide power, operational control, and protection to the components and modules within the controller 400 and/or the power tool 100. For example, the controller 400 includes, among other things, a processing unit 455 (e.g., a microprocessor, a microcontroller, or another suitable programmable device), a memory 460, input units 465, and output units 470. The processing unit 455 includes, among other things, a control unit 475, an arithmetic logic unit ("ALU") 480, and a plurality of registers 485 (shown as a group of registers in FIG. 14), and is implemented using a known computer architecture, such as a modified Harvard architecture, a von Neumann architecture, etc. The processing unit 455, the memory 460, the input units 465, and the output units 470 as well as the various modules connected to the controller 400 are connected by one or more control and/or data buses (e.g., common bus 490). The control and/or data buses are shown generally in FIG. 14 for illustrative purposes. The use of one or more control and/or data buses for the interconnection between and communication among the various modules and components would be known to a person skilled in the art in view of the invention described herein.

The memory 460 includes, for example, a program storage area and a data storage area. The program storage area and the data storage area can include combinations of different types of memory, such as read-only memory ("ROM"), random access memory ("RAM") (e.g., dynamic RAM ["DRAM"], synchronous DRAM ["SDRAM"], etc.), electrically erasable programmable read-only memory ("EEPROM"), flash memory, a hard disk, an SD card, or other suitable magnetic, optical, physical, electronic memory devices, or other data structures. The processing unit 455 is connected to the memory 460 and executes software instructions that are capable of being stored in a RAM of the memory 460 (e.g., during execution), a ROM of the memory 460 (e.g., on a generally permanent basis), or another non-transitory computer readable medium such as another memory or a disc. Software included in the implementation of the power tool 100 can be stored in the memory 460 of the controller 400. The software includes, for example, firmware, one or more applications, program data, filters, rules, one or more program modules, and other executable instructions. The controller 400 is configured to retrieve from memory and execute, among other things, instructions related to the control processes and methods described herein.

The battery pack interface 415 includes a combination of mechanical and electrical components configured to, and operable for, interfacing (e.g., mechanically, electrically, and communicatively connecting) the power tool 100 with the battery pack 130. For example, power provided by the battery pack 130 to the power tool 100 is provided through the battery pack interface 415 to the power input module 410. The power input module 410 includes combinations of active and passive components to regulate or control the power received from the battery pack 130 prior to power being provided to the controller 400. The battery pack interface 415 also supplies power to the FET switching module 440 to be switched by the switching FETs to selectively provide power to the motor 445. The battery pack interface 415 also includes, for example, a communication line 495 for providing a communication line or link between the controller 400 and the battery pack 130.

The indicators 405 include, for example, one or more light-emitting diodes ("LED"). The indicators 405 can be configured to display conditions of, or information associated with, the power tool 100. For example, the indicators 405 are configured to indicate measured electrical characteristics of the hand-held power tool, the status of the hand-held power tool, etc. The sensors 420 include, for example, one or more current sensors, one or more speed sensors, one or more Hall Effect sensors, one or more temperature sensors, one or more pressure sensors (e.g., to detect a fastener being placed against a work surface), etc. For example, the speed of the motor 445 can be determined using a plurality of Hall Effect sensors to sense the rotational position of the motor 445. The temperature sensors can be used to determine an ambient temperature of the air around the power tool 100. An accurate measurement of air temperature can be used to calculate an accurate value for the speed of sound, which improves the accuracy of ultrasonic distance sensors. In some embodiments, temperature sensors are included in the depth/angle sensor attachment 135 rather than the power tool 100.

The user input module 425 is operably coupled to the controller 400 to, for example, select a forward mode of operation or a reverse mode of operation, a torque and/or speed setting for the power tool 100, etc. In some embodiments, the user input module 425 includes a combination of digital and analog input or output devices required to achieve a desired level of operation for the power tool 100, such as one or more knobs, one or more dials, one or more switches, one or more buttons, etc. The trigger switch 430 is connected to the trigger 435 for controlling the power provided to the motor 445 through the switching FETs. In some embodiments, the amount of trigger pull detected by the trigger switch 430 is related to or corresponds to a desired speed of rotation of the motor 445. In other embodiments, the amount of trigger pull detected by the trigger switch 430 is related to or corresponds to a desired torque.

The depth/angle sensor attachment interface 450 provides an electrical and mechanical connection between the depth/angle sensor attachment 135 and the power tool 100. For example, the depth/angle sensor attachment 135 is mechanically connected or coupled to the power tool 100 via the rails 250, 255 on the depth/angle sensor attachment 135. The depth/angle sensor attachment 135 is mechanically released from its attachment to the power tool 100 by pressing the release button 210 and sliding the depth/angle sensor attachment 135 off of the power tool 100. The depth/angle sensor attachment 135 also electrically connects to the power tool 100 through the depth/angle sensor attachment interface 450 via terminals 240 on the depth/angle sensor attachment 135. The terminals 240 mate with corresponding terminals on the power tool housing 105. The power tool 100 is operable to provide power to the depth/angle sensor attachment 135 from the battery pack 130 through the depth/angle sensor attachment interface 450. The power tool 100 is also operable to receive control signals from the depth/angle sensor attachment 135 through the depth/angle sensor attachment interface 450 via terminals 240 related to the measured or detected depth of a fastener. When the power tool 100 and controller 400 receive a signal from the depth/angle sensor attachment 135 indicting that a desired depth has been reached, the controller 400 controls the FET switching module 440 to stop the motor 445.

Figure 15A:
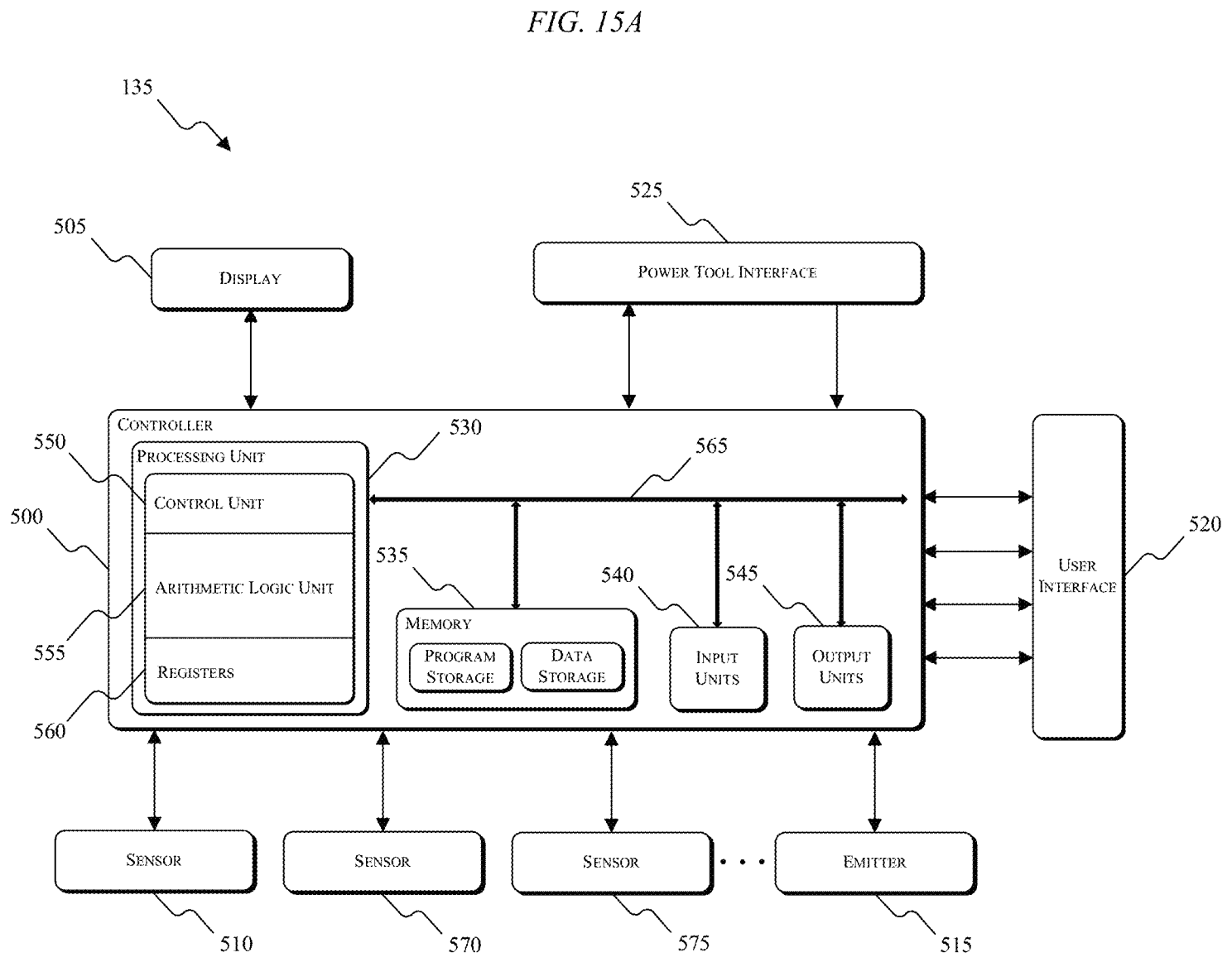

The depth/angle sensor attachment 135 is illustrated in greater detail in the electromechanical diagram of FIG. 15A. The depth/angle sensor attachment 135 includes a controller 500. The controller 500 is electrically and/or communicatively connected to a variety of modules or components of the depth/angle sensor attachment 135. For example, the illustrated controller 500 is connected to a display 505, a first sensor 510 (e.g., sensor 260 from FIG. 8), a first emitter 515 (e.g., emitter 265 from FIG. 8), a user interface 520, and a power tool interface 525. In some embodiments, the depth/angle sensor attachment 135 includes two or more sensors (e.g., three sensors) and one or more emitters (e.g., two emitters). The controller 500 includes combinations of hardware and software that are operable to, among other things, activate the display 505, receive signals from the sensors 510, 515, receive user input through the user interface 520, and receive power and communicate with the power tool 100 through the power tool interface 525. In some embodiments, the functionality described herein with respect to the controller 500 is instead performed by the controller 400 of the power tool 100. In such embodiments, the combination of the power tool 100 and the depth/angle sensor attachment 135 include one controller operable to perform all of the processes and functions described herein.

In some embodiments, the controller 500 includes a plurality of electrical and electronic components that provide power, operational control, and protection to the components and modules within the controller 500 and/or the depth/angle sensor attachment 135. For example, the controller 500 includes, among other things, a processing unit 530 (e.g., a microprocessor, a microcontroller, or another suitable programmable device), a memory 535, input units 540, and output units 545. The processing unit 530 includes, among other things, a control unit 550, an arithmetic logic unit ("ALU") 555, and a plurality of registers 560 (shown as a group of registers in FIG. 15A), and is implemented using a known computer architecture, such as a modified Harvard architecture, a von Neumann architecture, etc. The processing unit 530, the memory 535, the input units 540, and the output units 545 as well as the various modules connected to the controller 500 are connected by one or more control and/or data buses (e.g., common bus 565). The control and/or data buses are shown generally in FIG. 15A for illustrative purposes. The use of one or more control and/or data buses for the interconnection between and communication among the various modules and components would be known to a person skilled in the art in view of the invention described herein. In some embodiments, the controller 500 is mounted on the PCB 270 (see FIG. 11).

The memory 535 includes, for example, a program storage area and a data storage area. The program storage area and the data storage area can include combinations of different types of memory, such as read-only memory ("ROM"), random access memory ("RAM") (e.g., dynamic RAM ["DRAM"], synchronous DRAM ["SDRAM"], etc.), electrically erasable programmable read-only memory ("EEPROM"), flash memory, a hard disk, an SD card, or other suitable magnetic, optical, physical, electronic memory devices, or other data structures. The processing unit 530 is connected to the memory 535 and executes software instructions that are capable of being stored in a RAM of the memory 535 (e.g., during execution), a ROM of the memory 535 (e.g., on a generally permanent basis), or another non-transitory computer readable medium such as another memory or a disc. Software included in the implementation of the depth/angle sensor attachment 135 can be stored in the memory 535 of the controller 500. The software includes, for example, firmware, one or more applications, program data, filters, rules, one or more program modules, and other executable instructions. The controller 500 is configured to retrieve from memory and execute, among other things, instructions related to the control processes and methods described herein.

Figure 15B:
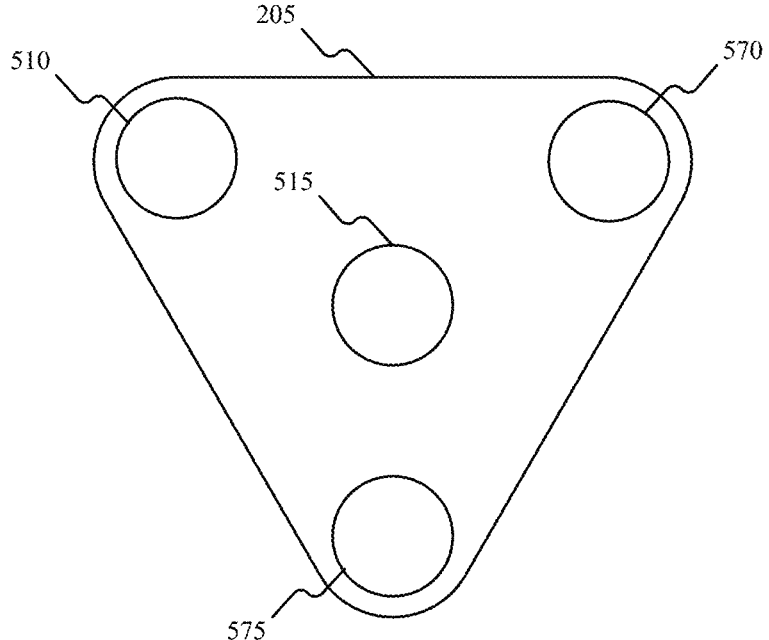
FIG. 15B illustrates a sensor housing for a depth/angle sensor attachment that includes three non-contact sensors according to an embodiment of the invention.

The display 505, like the display 215 described above is, for example, an LED display such as a seven segment LED display or an LCD. The display 505 is operable or configured to provide an indication to a user of, for example, a current depth of a fastener, a desired depth for a fastener, power tool misalignment, etc. The first sensor 510 and the first emitter 515 form, for example, an ultrasonic distance sensor. In other embodiments, the first sensor 510 and the first emitter 515 form a laser distance sensor, an infrared sensor, or another non-contact sensor that can be used to accurately determine a distance between two objects. In some embodiments, more than one sensor is included in the depth/angle sensor attachment 135 (e.g., a second sensor 570 and a third sensor 575 are included). For example, FIG. 15B illustrates a sensor housing 205 for the depth/angle sensor attachment 135 that includes three sensors 510, 570, and 575 arranged in a triangular patter around the emitter 515. The user interface 520 includes the UP button 220, the DOWN button 225, the MODE selection button 230, and the UNITS selection button 235 described above. Each button 220, 225, 230, 235 provides a signal to the controller 500 related to a desired control action for the depth/angle sensor attachment 135. The memory 535 of the controller 500 can be updated based on the signals received through the user interface 520. In some embodiments, the depth/angle sensor attachment 135 is controlled via a remote device, such as a mobile phone or tablet computer. In such embodiments, the depth/angle sensor attachment 135 or power tool 100 includes a communications interface for communicating with the remote device using a communication protocol such as Bluetooth. The interaction between the depth/angle sensor attachment 135 or the power tool 100 is similar to that described in U.S. Pat. No. 10,295,990, granted May 21, 2019 and entitled "USER INTERFACE FOR TOOL CONFIGURATION AND DATA CAPTURE," the entire content of which is hereby incorporated by reference and reproduced in part below. The controls available to the remote device include the controls available through the buttons 220, 225, 230, 235. The remote device is also operable to receive and display information from the depth/angle sensor attachment or power tool 100 (e.g., current drill depth, current tool alignment, etc.).

The power tool interface 525 is a complementary interface to the depth/angle sensor attachment interface 450 in FIG. 14. The interface 525 provides an electrical and mechanical connection between the depth/angle sensor attachment 135 and the power tool 100. For example, the depth/angle sensor attachment 135 is mechanically connected or coupled to the power tool 100 via the rails 250, 255 on the depth/angle sensor attachment 135. In some embodiments, the power tool interface 525 is similar to the interface for a dust collector disclosed in U.S. Design Pat. No. D741,557, issued Oct. 20, 2015 and entitled "DUST COLLECTOR," or U.S. Design Pat. No. D742,081, issued Oct. 27, 2015 and entitled "DUST COLLECTOR," the entire contents of both of which are hereby incorporated by reference. The depth/angle sensor attachment 135 is mechanically released from its attachment to the power tool 100 by pressing the release button 210 and sliding the depth/angle sensor attachment 135 off of the power tool 100. The depth/angle sensor attachment 135 also electrically connects to the power tool 100 through the power tool 525 via terminals 240 on the depth/angle sensor attachment 135. The terminals 240 mate with corresponding terminals on the power tool housing 105. The depth/angle sensor attachment 135 is operable to receive power from the battery pack 130 through the power tool interface 525. The depth/angle sensor attachment 135 is also operable to send control signals through the power tool interface 525 via terminals 240 related to the measured or detected depth of a fastener. When the depth/angle sensor attachment 135 and controller 500 send a signal to the power tool 100 indicting that a desired depth has been reached, the controller 400 of the power tool 100 controls the FET switching module 440 to stop the motor 445.

Figure 16:
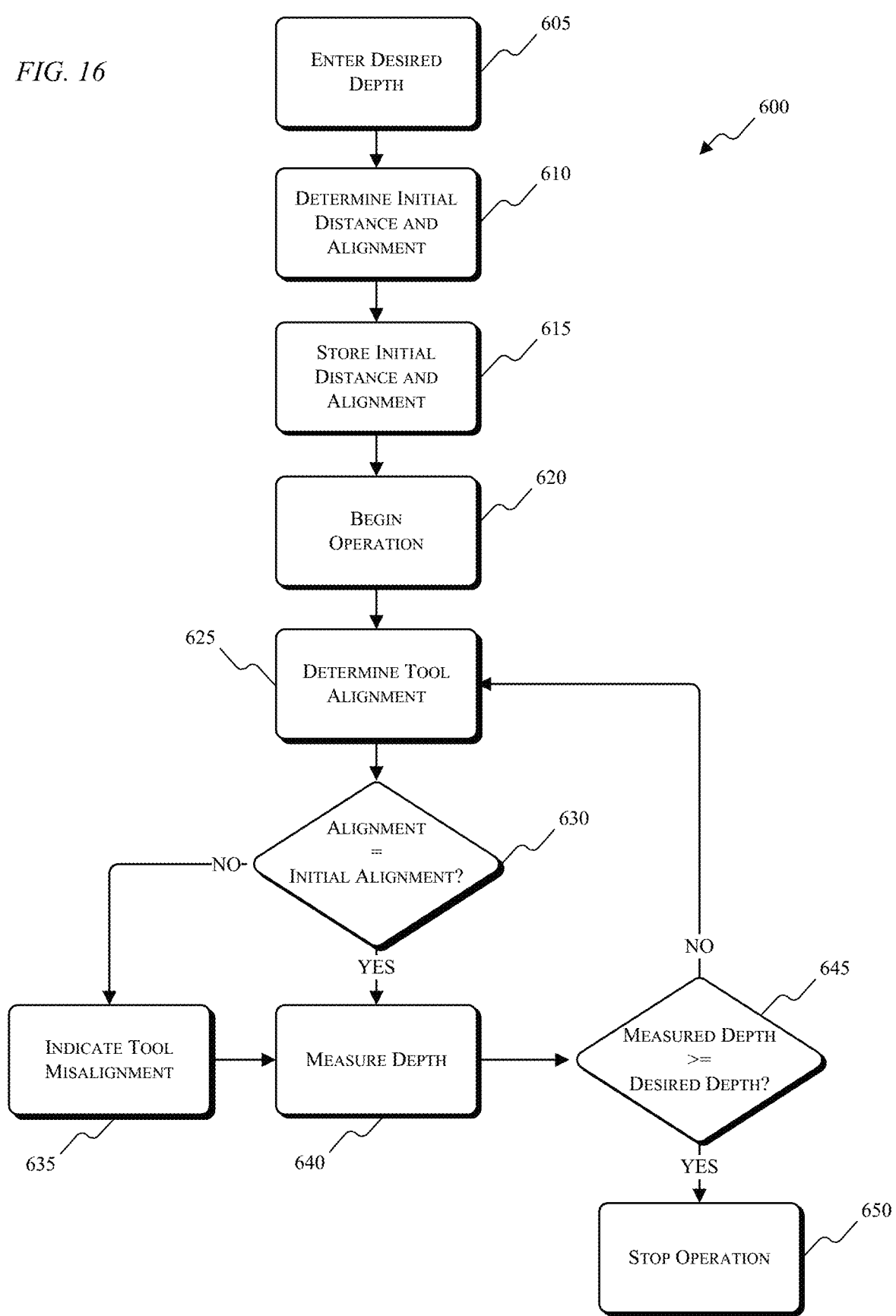
FIG. 16 is a process for controlling the power tool of FIGS. 1-4 using the depth/angle sensor attachment of FIGS. 5-10 according to an embodiment of the invention.

A process 600 for controlling the operation of the power tool 100 using the depth/angle sensor attachment 135 is illustrated in FIG. 16. The process 600 begins with a user entering a desired depth for a fastener (step 605). The desired depth for the fastener can be entered using the buttons 220, 225 or a remote device, as described above. At step 610, the sensor attachment 135 determines an initial distance of the sensor 510 (and/or sensors 570 and 575) from a work surface and an initial alignment of the power tool 100 (e.g., based on the output signals from the sensors 510, 570, and 575). The initial distance and alignment are stored in memory (e.g., the memory 535 of the sensor attachment 135) (step 615). An operation begins when a user places a fastener against a work surface (step 620). The beginning of an operation can be detected using a sensor (e.g., a pressure sensor) or, for example, the power tool being held stationary for a period of time before the trigger 120 is pulled. In some embodiments, the operation begins when the trigger 120 is pulled.

At step 625, the controller 500 determines the alignment of the power tool. The alignment of the power tool is determined by comparing the initial alignment from step 610 to the current tool alignment. In some embodiments, the alignment of the tool corresponds to the respective distance measurements from the sensors 510, 570, and 575. From the distance measurements, an angle of the sensor attachment 135 with respect to the work surface can be determined. For example, the differences among the distance measurements from the sensors 510, 570, and 575, as well as a known distance between each of the sensors 510, 270, and 575, allows the controller 500 to geometrically calculate an angle of the sensor attachment with respect to the work surface. In other embodiments, a sensor internal to the depth/angle sensor attachment 135 and separate from the sensors 510, 570, and 575 can be used to determine the alignment of the power tool. For example, the depth/angle sensor attachment 135 can use one or more accelerometers, gyroscopes, and/or magnetometers to detect velocity, orientation, and gravitational forces and determine the alignment of the power tool 100.

If, at step 630, the initial power tool alignment does not equal the current power tool alignment within a reasonable error (e.g., +/−5° with respect to vertical and/or horizontal), a misalignment is detected and an indication of the misalignment is provided to the user as set forth above (step 635). If, at step 630, the power tool 100 is not misaligned, the controller 500 determines or measures the depth of the fastener based on output signals from the sensor 510 (and/or sensors 570 and 575) (step 640). The depth is determined based on a comparison of the current distance of the sensor attachment 135 from the work surface and the initial distance of the sensor attachment 135 from the work surface. The measured depth is then compared to the desired depth from step 605 (step 645). If the measured depth is less than the desired depth, the process 600 returns to step 625 to again determine tool alignment. If, however, the measured depth is equal to or greater than the desired depth, the controller 500 generates a control signal that is sent to the power tool 100 so the controller 400 can shut off the motor 445 (step 650). In some embodiments, rather than shutting off the motor automatically, a feedback device is used to alert an operator that desired depth has been reached. The feedback mechanism is, for example, a light (e.g., an LED) for providing a visual notification, a speaker for providing an audible notification, a motor for creating a vibratory or tactile notification, etc. After the operator is alerted by the notification, the operator can manually stop operation by releasing the trigger 120. After the fastener has reached a desired depth and the motor 445 has been shut off, the process 600 can be reset for the next fastening operation. In some embodiments, if a user has not modified a desired depth setting, the process 600 can begin at step 610 for subsequent fastening operations.

Figure 17:
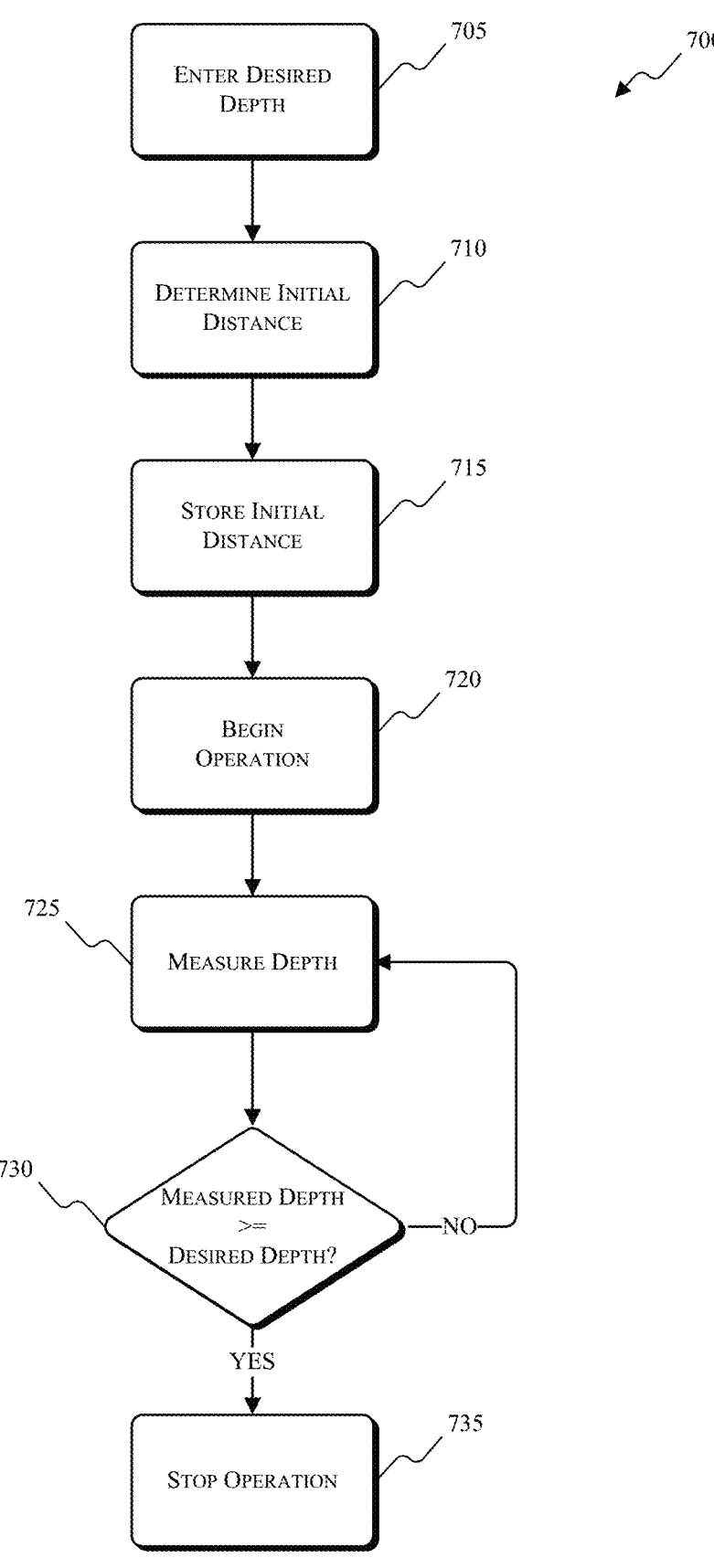
FIG. 17 is another process for controlling the power tool of FIGS. 1-4 using the depth/angle sensor attachment of FIGS. 5-10 according to an embodiment of the invention.

Another process 700 for controlling the operation of the power tool 100 using the depth/angle sensor attachment 135 is illustrated in FIG. 17. The process 700 begins with a user entering a desired depth for a fastener (step 705). The desired depth for the fastener can be entered using the buttons 220, 225 or a remote device, as described above. At step 710, the sensor attachment 135 determines an initial distance of the sensor 510 from a work surface (e.g., based on the output signals from the sensor 510). The initial distance is stored in memory (e.g., the memory 535 of the sensor attachment 135) (step 715). An operation begins when a user places a fastener against a work surface (step 720). The beginning of an operation can be detected using a sensor (e.g., a pressure sensor) or, for example, the power tool being held stationary for a period of time before the trigger 120 is pulled. In some embodiments, the operation begins when the trigger 120 is pulled.

At step 725, the controller 500 determines or measures the depth of the fastener based on output signals from the sensor 510. The depth is determined based on a comparison of the current distance of the sensor attachment 135 from the work surface and the initial distance of the sensor attachment 135 from the work surface. The measured depth is then compared to the desired depth from step 705 (step 730). If the measured depth is less than the desired depth, the process 700 returns to step 725 to again determine fastener depth. If, however, the measured depth is equal to or greater than the desired depth, the controller 500 generates a control signal that is sent to the power tool 100 so the controller 400 can shut off the motor 445 (step 735). In some embodiments, rather than shutting off the motor automatically, a feedback device is used to alert an operator that desired depth has been reached. The feedback mechanism is, for example, a light (e.g., an LED) for providing a visual notification, a speaker for providing an audible notification, a motor for creating a vibratory or tactile notification, etc. After the operator is alerted by the notification, the operator can manually stop operation by releasing the trigger 120. After the fastener has reached a desired depth and the motor 445 has been shut off, the process 700 can be reset for the next fastening operation. In some embodiments, if a user has not modified a desired depth setting, the process 700 can begin at step 710 for subsequent fastening operations.

Figure 18:
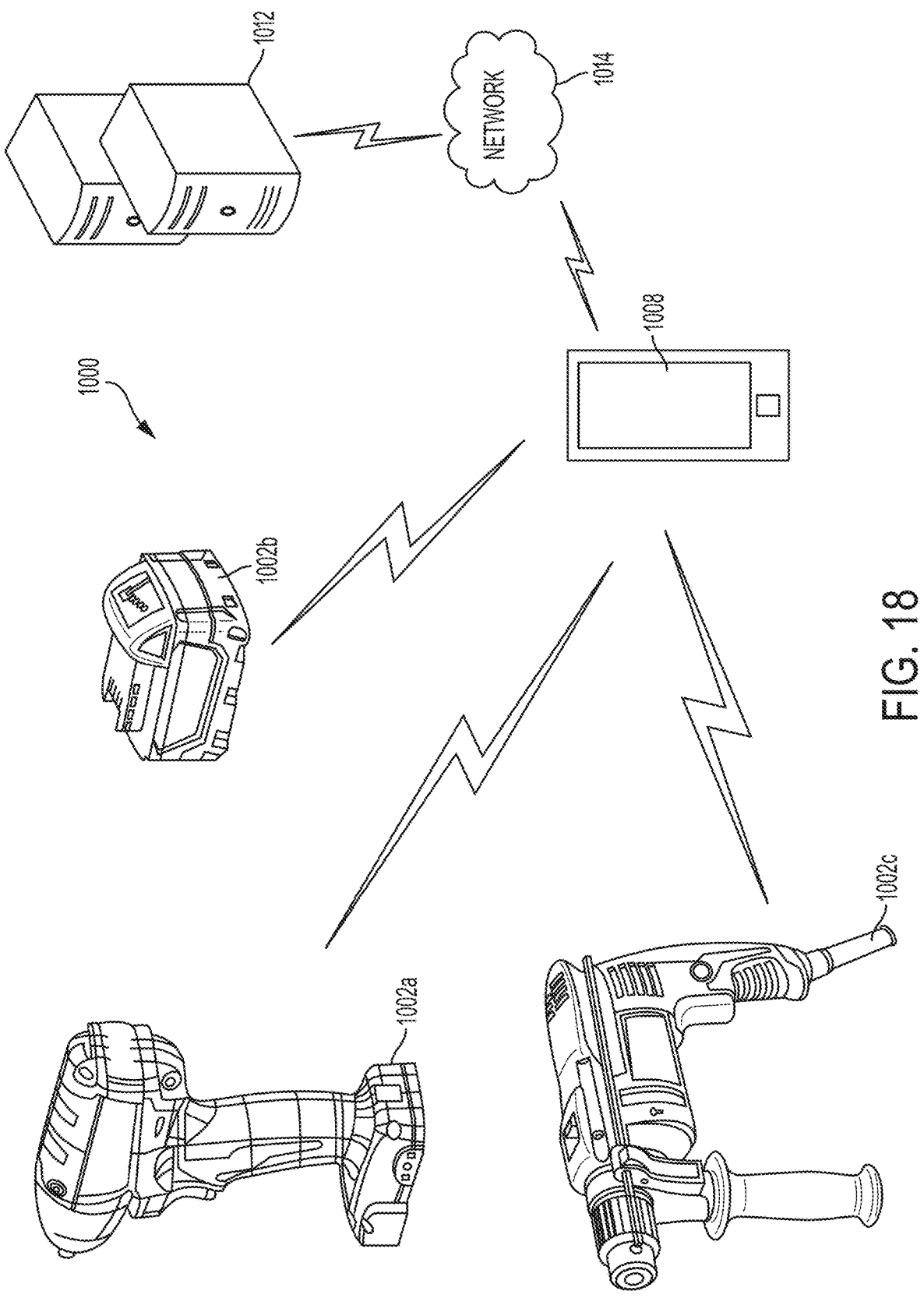
FIG. 18 illustrates a communication system according to one embodiment of the invention.

FIG. 18 illustrates a communication system 1000. The communication system 100 includes power tool devices 1002, which are similar to the power tool 100 described above, and an external device 1008. Each power tool device

1002 (e.g., battery powered impact driver 1002 *a*, power tool battery pack 1002 *b*, and mains-powered hammer drill 1002 *c*) and the external device 1008 can communicate wirelessly while they are within a communication range of each other. Each power tool device 1002 may communicate power tool status, power tool operation statistics, power tool identification, stored power tool usage information, power tool maintenance data, and the like. Therefore, using the external device 1008, a user can access stored power tool usage or power tool maintenance data. With this tool data, a user can determine how the power tool device 1002 has been used, whether maintenance is recommended or has been performed in the past, and identify malfunctioning components or other reasons for certain performance issues. The external device 1008 can also transmit data to the power tool device 1002 for power tool configuration, firmware updates, or to send commands (e.g., turn on a work light). The external device 1008 also allows a user to set operational parameters, safety parameters, select tool modes, and the like for the power tool 1002.

The external device 1008 may be, for example, a smart phone (as illustrated), a laptop computer, a tablet computer, a personal digital assistant (PDA), or another electronic device capable of communicating wirelessly with the power tool device 1002 and providing a user interface. The external device 1008 generates the user interface and allows a user to access and interact with tool information. The external device 1008 can receive user inputs to determine operational parameters, enable or disable features, and the like. The user interface of the external device 1008 provides an easy-to-use interface for the user to control and customize operation of the power tool.

The external device 1008 includes a communication interface that is compatible with a wireless communication interface or module of the power tool device 1002. The communication interface of the external device 1008 may include a wireless communication controller (e.g., a Bluetooth® module), or a similar component. The external device 1008, therefore, grants the user access to data related to the power tool device 1002, and provides a user interface such that the user can interact with the processor of the power tool device 1002.

In addition, as shown in FIG. 18, the external device 1008 can also share the information obtained from the power tool device 1002 with a remote server 1012 connected by a network 1014. The remote server 1012 may be used to store the data obtained from the external device 1008, provide additional functionality and services to the user, or a combination thereof. In one embodiment, storing the information on the remote server 1012 allows a user to access the information from a plurality of different locations. In another embodiment, the remote server 1012 may collect information from various users regarding their power tool devices and provide statistics or statistical measures to the user based on information obtained from the different power tools. For example, the remote server 1012 may provide statistics regarding the experienced efficiency of the power tool device 1002, typical usage of the power tool device 1002, and other relevant characteristics and/or measures of the power tool device 1002. The network 1014 may include various networking elements (routers, hubs, switches, cellular towers, wired connections, wireless connections, etc.) for connecting to, for example, the Internet, a cellular data network, a local network, or a combination thereof. In some embodiments, the power tool device 1002 may be configured to communicate directly with the server 1012 through an additional wireless communication interface or with the same wireless communication interface that the power tool device 1002 uses to communicate with the external device 1008.

Figure 19:
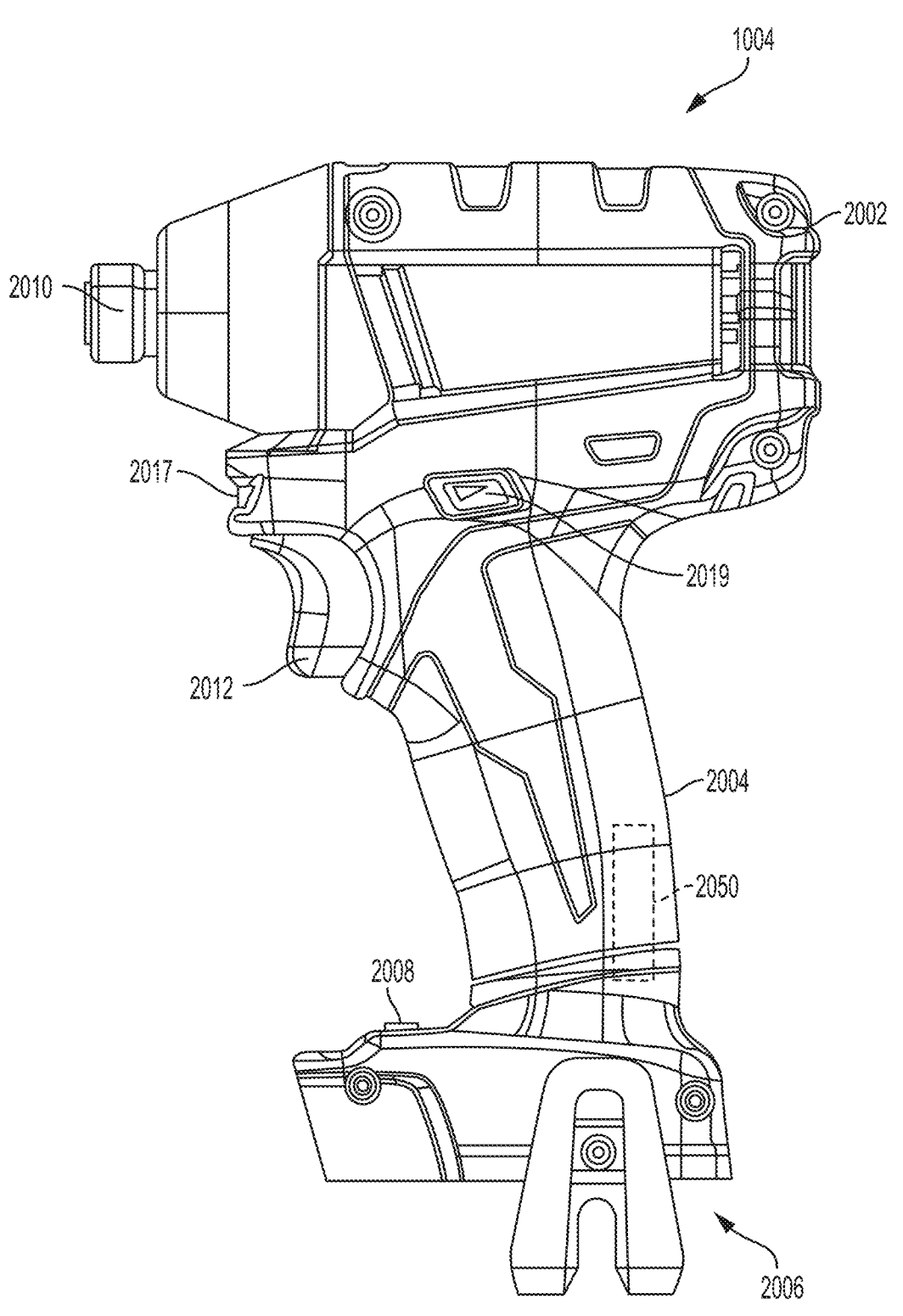
FIG. 19 illustrates a power tool of the communication system.

The particular power tool devices 1002 illustrated and described herein (e.g., an impact driver) are merely representative. Other embodiments of the communication system 1000 include a variety of types of power tools 1002 (e.g., a power drill, a hammer drill, a pipe cutter, a sander, a nailer, a grease gun, etc.). FIG. 19 illustrates an example of the power tool devices 1002, an impact driver 1004 (herein power tool 1004). The power tool 1004 is representative of various types of power tools that operate within system 1000. Accordingly, the description with respect to the power tool 1004 in the system 1000 is similarly applicable to other types of power tools. As shown in FIG. 19, the power tool 1004 includes an upper main body 2002, a handle 2004, a battery pack receiving portion 2006, mode pad 2008, an output drive device or mechanism 2010, a trigger 2012, a work light 2017, and forward/reverse selector 2019. The housing of the power tool 1004 (e.g., the main body 2002 and the handle 2004) are composed of a durable and light-weight plastic material. The drive device 2010 is composed of a metal (e.g., steel). The drive device 2010 on the power tool 1004 is a socket. However, each power tool 1004 may have a different drive device 2010 specifically designed for the task (or primary function) associated with the power tool 1004. For example, the drive device for a power drill may include a bit driver, while the drive device for a pipe cutter may include a blade. The battery pack receiving portion 2006 is configured to receive and couple to the battery pack (e.g., 1002 *b* of FIG. 18) that provides power to the power tool 1004. The battery pack receiving portion 2006 includes a connecting structure to engage a mechanism that secures the battery pack and a terminal block to electrically connect the battery pack to the power tool 1004. The mode pad 2008 allows a user to select a mode of the power tool 1004 and indicates to the user the currently selected mode of the power tool 1004, which are described in greater detail below.

Figure 20:
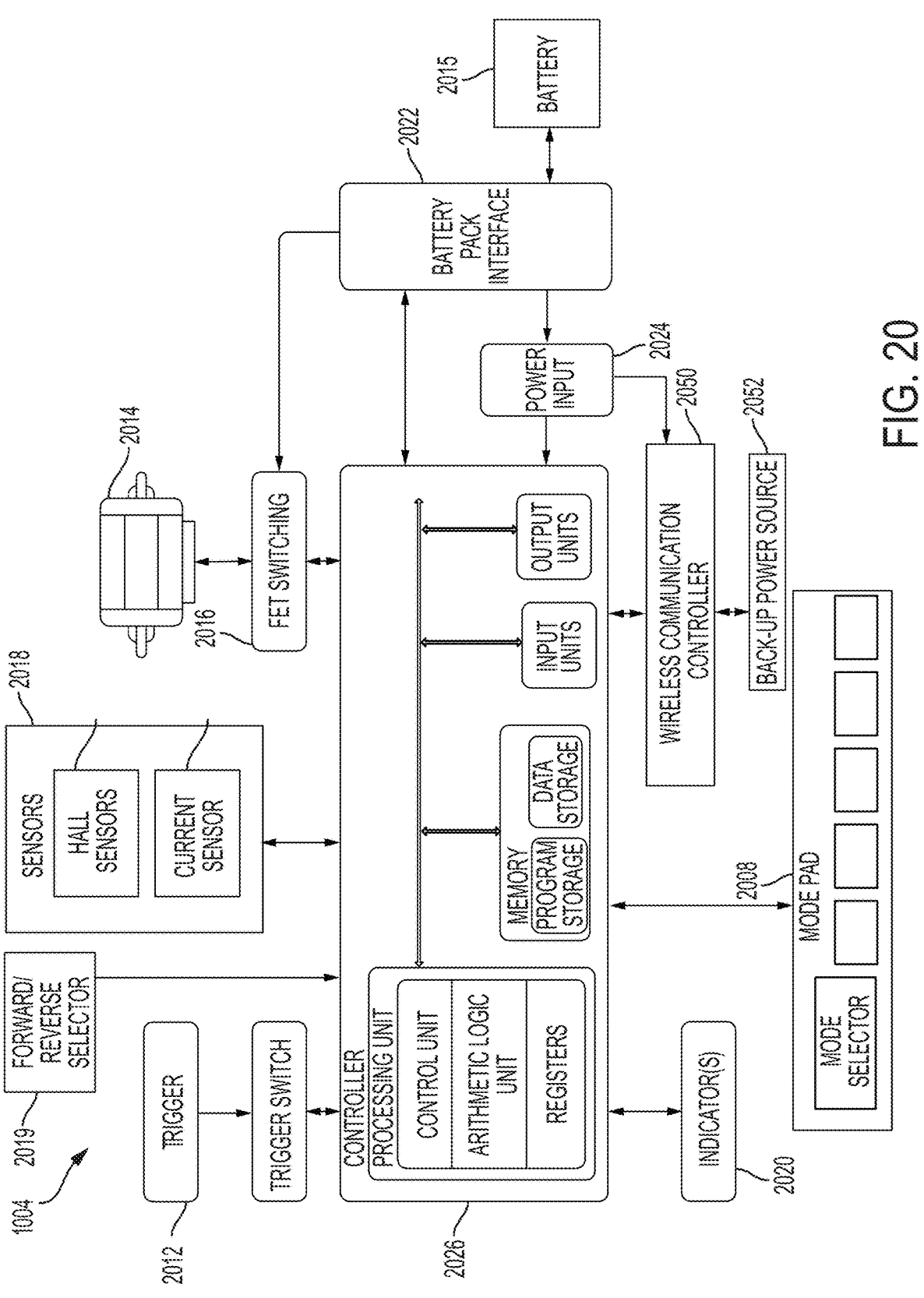
FIGS. 20-21 illustrate a schematic diagram of the power tool.

As shown in FIG. 20, the power tool 1004 also includes a motor 2014. The motor 2014 actuates the drive device 2010 and allows the drive device 2010 to perform the particular task. A primary power source (e.g., a battery pack) 2015 couples to the power tool 1004 and provides electrical power to energize the motor 2014. The motor 2014 is energized based on the position of the trigger 2012. When the trigger 2012 is depressed the motor 2014 is energized, and when the trigger 2012 is released, the motor 2014 is de-energized.

As also shown in FIG. 20, the power tool 1004 also includes a switching network 2016, sensors 2018, indicators 2020, the battery pack interface 2022, a power input unit 2024, a controller 2026, a wireless communication controller 2050, and a back-up power source 2052.

The wireless communication controller 2050 is coupled to the controller 2026. In the illustrated embodiment, the wireless communication controller 2050 is located near the foot of the power tool 1004 (see FIG. 19) to save space and ensure that the magnetic activity of the motor 2014 does not affect the wireless communication between the power tool 1004 and the external device 1008. As a particular example, in some embodiments, the wireless communication controller 2050 is positioned under the mode pad 2008.

Figure 21:
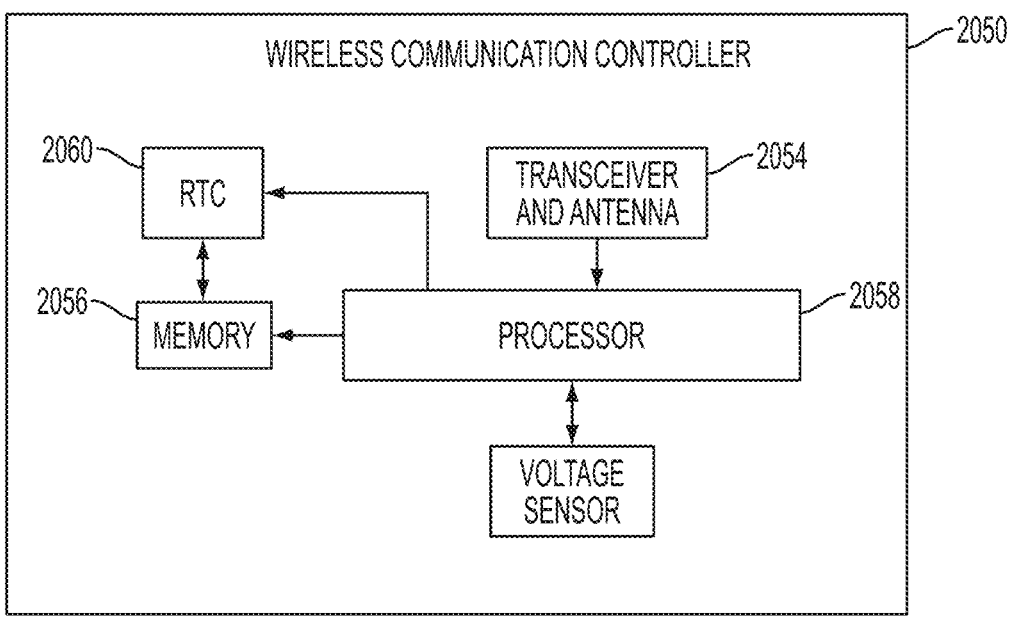

As shown in FIG. 21, the wireless communication controller 2050 includes a radio transceiver and antenna 2054, a memory 2056, a processor 2058, and a real-time clock 2060. The radio transceiver and antenna 2054 operate together to send and receive wireless messages to and from the external device 1008 and the processor 2058. The memory 2056 can store instructions to be implemented by the processor 2058 and/or may store data related to communications between the power tool 1004 and the external device 1008 or the like. The processor 2058 for the wireless communication controller 2050 controls wireless communications between the power tool 1004 and the external device 1008. For example, the processor 2058 associated with the wireless communication controller 2050 buffers incoming and/or outgoing data, communicates with the controller 2026, and determines the communication protocol and/or settings to use in wireless communications.

In the illustrated embodiment, the wireless communication controller 2050 is a Bluetooth® controller. The Bluetooth® controller communicates with the external device 1008 employing the Bluetooth® protocol. Therefore, in the illustrated embodiment, the external device 1008 and the power tool 1004 are within a communication range (i.e., in proximity) of each other while they exchange data. In other embodiments, the wireless communication controller 2050 communicates using other protocols (e.g., Wi-Fi, cellular protocols, a proprietary protocol, etc.) over a different type of wireless network. For example, the wireless communication controller 2050 may be configured to communicate via Wi-Fi through a wide area network such as the Internet or a local area network, or to communicate through a piconet (e.g., using infrared or NFC communications). The communication via the wireless communication controller 2050 may be encrypted to protect the data exchanged between the power tool 1004 and the external device/network 1008 from third parties.

The wireless communication controller 2050 is configured to receive data from the power tool controller 2026 and relay the information to the external device 1008 via the transceiver and antenna 2054. In a similar manner, the wireless communication controller 2050 is configured to receive information (e.g., configuration and programming information) from the external device 1008 via the transceiver and antenna 2054 and relay the information to the power tool controller 2026.

Figure 22:
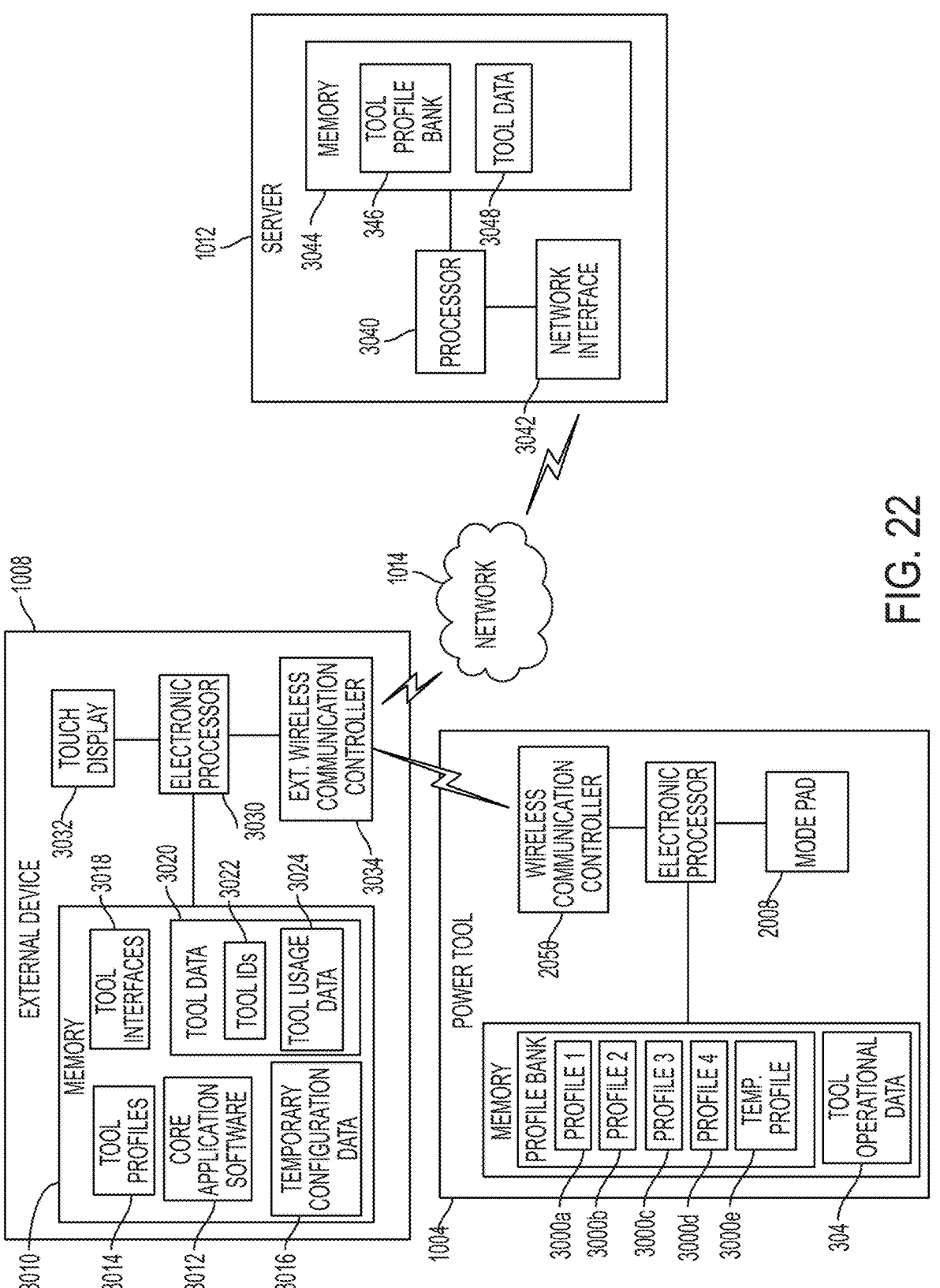
FIG. 22 illustrates a schematic diagram of the communication system including the power tool.

With reference to FIG. 22, the external device 1008 includes a memory 3010 storing core application software 3012, tool mode profiles 3014, temporary configuration data 3016, tool interfaces 3018, tool data 3020 including received tool identifiers 3022 and received tool usage data 3024 (e.g., tool operational data). The external device 1008 further includes an electronic processor 3030, a touch screen display 3032, and an external wireless communication controller 3034. The electronic processor 3030 and memory 3010 may be part of a controller having similar components as the power tool controller 2026. The touch screen display 3032 allows the external device 1008 to output visual data to a user and receive user inputs. Although not illustrated, the external device 1008 may include further user input devices (e.g., buttons, dials, toggle switches, and a microphone for voice control) and further user outputs (e.g., speakers and tactile feedback elements). Additionally, in some instances, the external device 1008 has a display without touch screen input capability and receives user input via other input devices, such as buttons, dials, and toggle switches. The external device 1008 communicates wirelessly with the wireless communication controller 2050 via the external wireless communication controller 3034, e.g., using a Bluetooth® or Wi-Fi® protocol. The external wireless communication controller 3034 further communicates with the server 1012 over the network 1014. The external wireless communication controller 3034 includes at least one transceiver to enable wireless communications between the external device 1008 and the wireless communication controller 2050 of the power tool 1004 or the server 1012 through the network 1014. In some instances, the external wireless communication controller 3034 includes two separate wireless communication controllers, one for communicating with the wireless communication controller 2050 (e.g., using Bluetooth® or Wi-Fi® communications) and one for communicating through the network 1014 (e.g., using Wi-Fi or cellular communications).

The server 1012 includes a processor 3040 that communicates with the external device 1008 over the network 1014 using a network interface 3042. The communication link between the network interface 3042, the network 1014, and the external wireless communication controller 3034 may include various wired and wireless communication pathways, various network components, and various communication protocols. The server 1012 further includes a memory 3044 including a tool profile bank 3046 and tool data 3048.

Returning to the external device 1008, the core application software 3012 is executed by the electronic processor 3030 to generate a graphical user interface (GUI) on the touch screen display 3032 enabling the user to interact with the power tool 1004 and server 1012. In some embodiments, a user may access a repository of software applications (e.g., an "app store" or "app marketplace") using the external device 1008 to locate and download the core application software 3012, which may be referred to as an "app." In some embodiments, the tool mode profiles 3014, tool interfaces 3018, or both may be bundled with the core application software 3012 such that, for instance, downloading the "app" includes downloading the core application software 3012, tool mode profiles 3014, and tool interfaces 3018. In some embodiments, the app is obtained using other techniques, such as downloading from a website using a web browser on the external device 1008. As will become apparent from the description below, at least in some embodiments, the app on the external device 1008 provides a user with a single entry point for controlling, accessing, and/or interacting with a multitude of different types of tools. This approach contrasts with, for instance, having a unique app for each type of tool or for small groupings of related types of tools.

Figure 23:
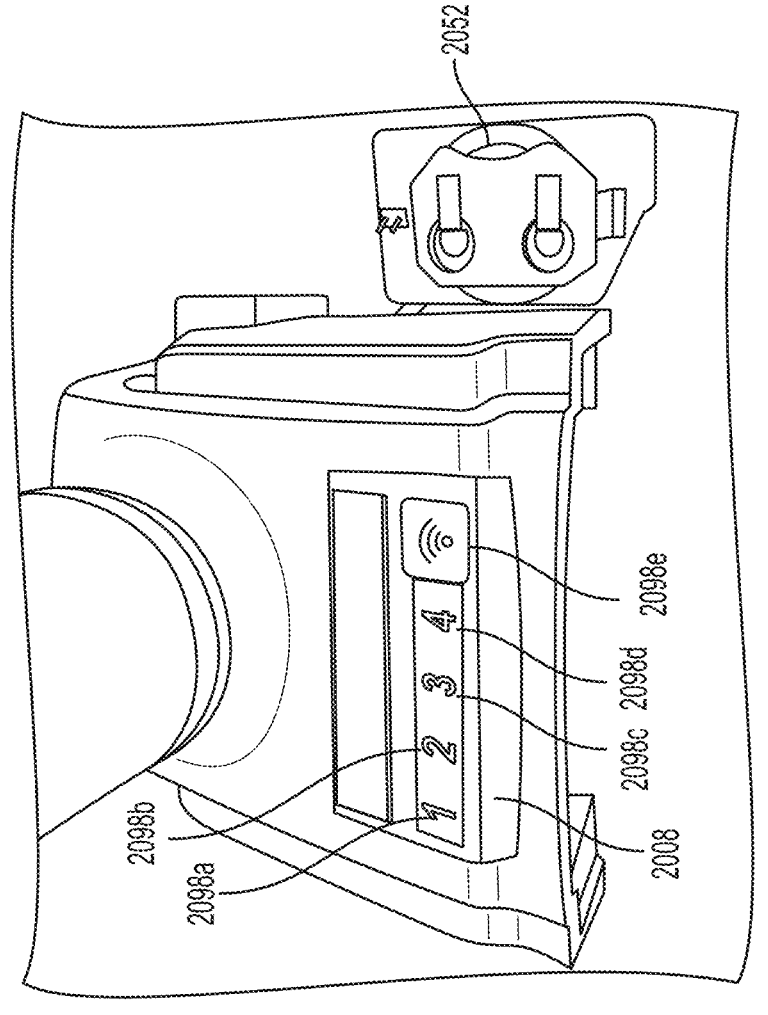
FIG. 23 illustrates a mode pad of the power tool.
Figure 24:
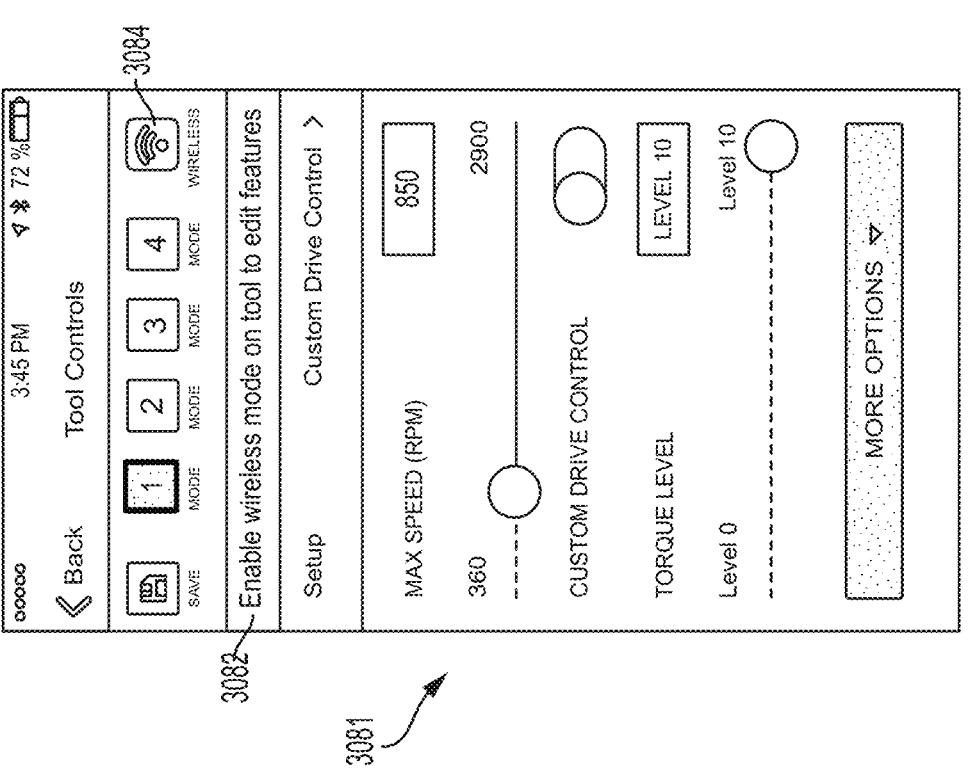
FIGS. 24, 25A, 25B, and 26 illustrate exemplary screenshots of a user interface of an external device of the communication system.

When the adaptive mode is currently selected on the power tool 1004, as indicated by the indicating symbol 2098 *e* (FIG. 23), the user is able to configure (e.g., change some of the parameters of the temporary mode profile 3000 *e*) the power tool 1004 using the control screen 380. When the power tool 1004 is in one of the other four tool modes, as indicated by one of the indicating symbols 2098 *a-d*, the power tool 1004 is not currently configurable via the control screen 3080. For instance, in FIG. 24, a control screen 3081 is illustrated when the power tool is not currently in the adaptive mode. Here, the control screen 3081 is similar to the control screen 3080, but includes a message 3082 indicating that the tool is not in the adaptive mode and a wireless symbol 3084 is shown greyed-out as a further indication that the power tool is not in the adaptive mode. Accordingly, when the power tool 1004 is not in the adaptive mode and a user selects one of the mode profile buttons, the power tool 1004 provides the mode profile 3000 of the associated mode selected by the user, but does not overwrite the temporary mode profile 3000 *e* with the mode profile. Thus, the mode profiles 3000 of the power tool 1004 are not updated when the power tool 1004 is not in the adaptive mode.

Figure 25B:
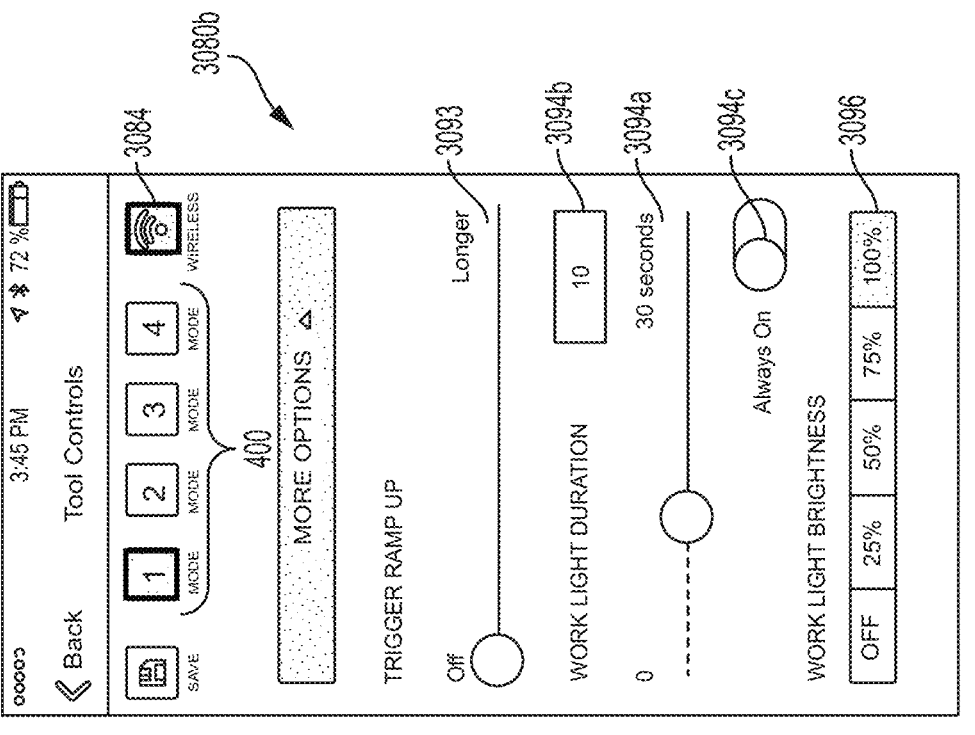
Figure 25A:
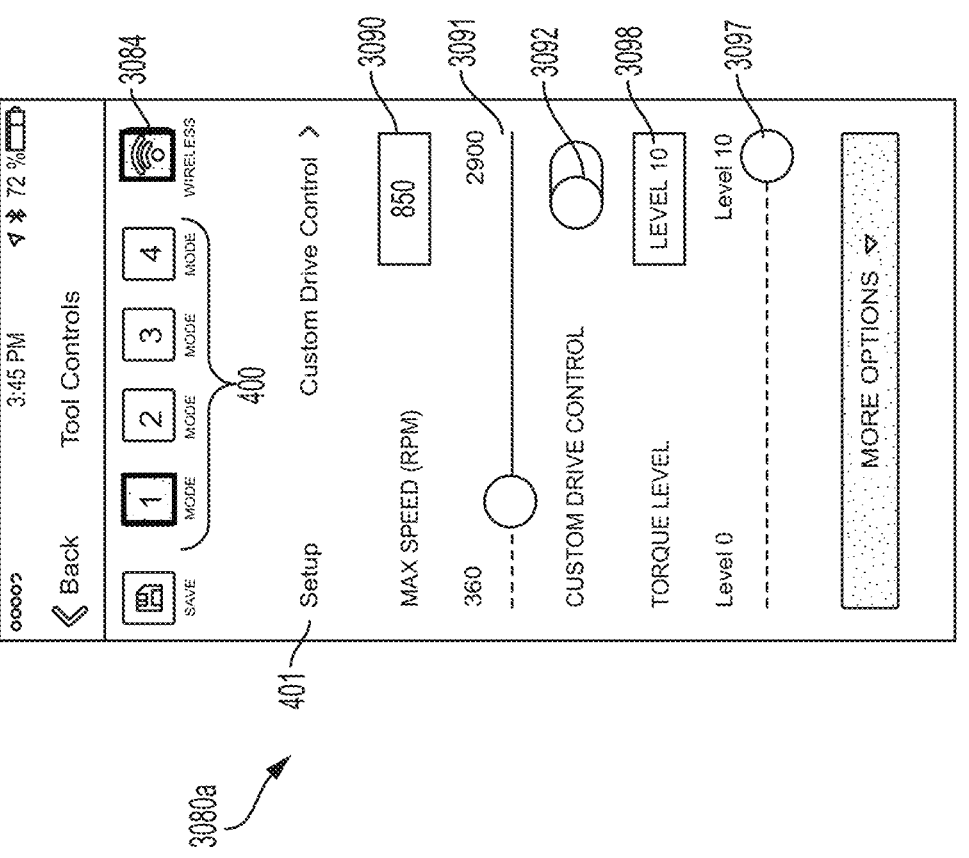
Figure 26:
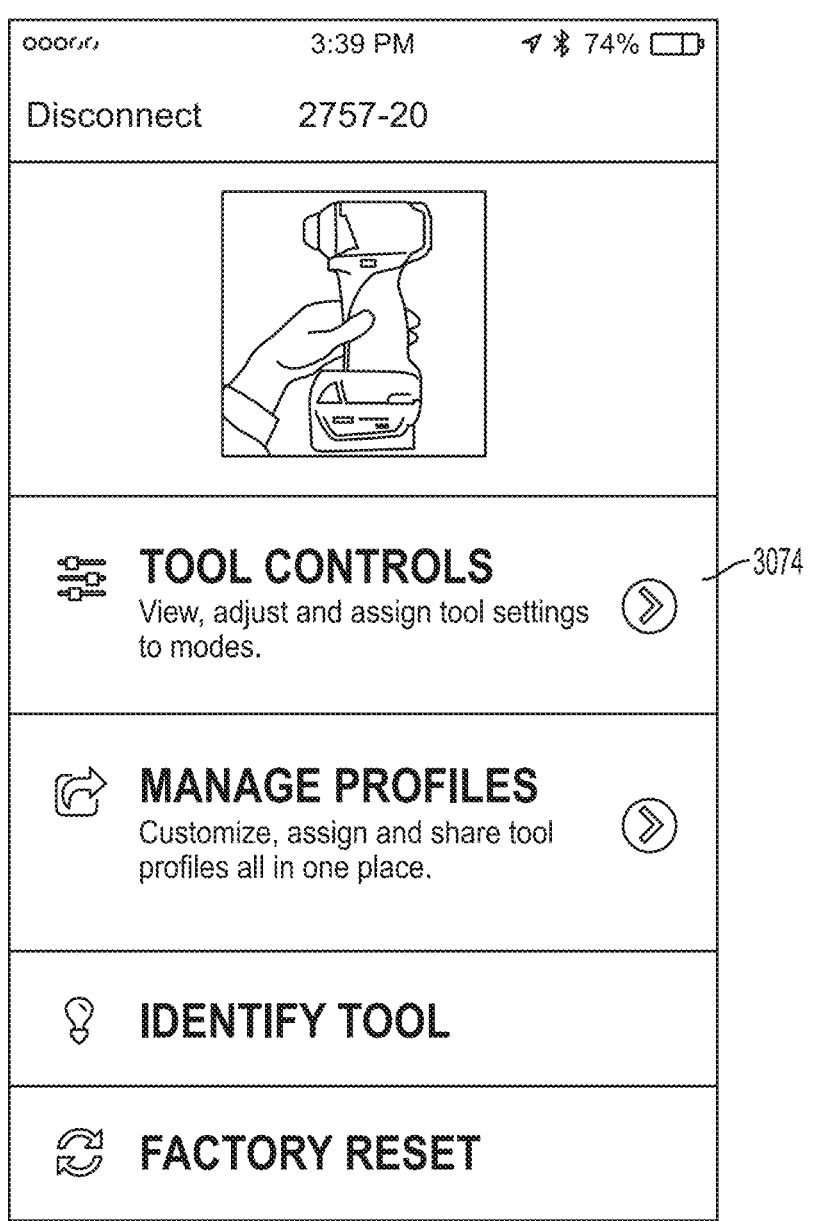

Referring to FIGS. 25A-B, when the power tool 1004 is in the adaptive mode and the user selects the tool controls 3074 (FIG. 26) on the home screen, the user is able to configure profile data of the power tool 1004 using a control screen of the tool interface. For instance, via the control screen 3080, the user is able to configure the current profile data of the temporary mode profile 3000 *e* of the power tool 1004. As illustrated, the user is able to adjust the maximum speed via the speed text box 3090 or the speed slider 3091; enable/disable the custom drive control using the toggle 3092; alter the trigger ramp up parameter via slider 3093; adjust the work light duration with slider 3094 *a*, work light text box 3094 *b*, and "always on" toggle 3094 *c*; and adjust the work light intensity via the work light brightness options 3096. Upon enabling the toggle 3092, the torque level control elements become active and are no longer greyed-out, such that a user can adjust the torque level using the slider 3097 or torque text box 3098.

Thus, the invention provides, among other things, a power tool including a sensor attachment for detecting the depth of a fastener in a non-contact manner. Various features and advantages of the invention are set forth in the following claims.

What is claimed is:

1. A method of controlling a power tool, the power tool including a motor within a power tool housing, a sensor attachment physically coupled to the power tool housing, and a communications interface for wirelessly communicating with a remote device, the method comprising:
 receiving, at a controller, an input signal from the remote device;
 determining, using the controller, a desired fastener depth based on the input signal;
 receiving, at the controller, a sensor signal from a non-contact sensor;
 determining, using the controller, a depth of a fastener based on the sensor signal received; and
 generating, using the controller, a control signal when the depth of the fastener is greater than or equal to the desired fastener depth,
 wherein the control signal is operable to cause power to the motor to be turned off.

2. The method of claim 1, further comprising:
 receiving, at the controller, a sensor signal from a second non-contact sensor and a sensor signal from a third non-contact sensor.

3. The method of claim 2, further comprising:
 determining, using the controller, the depth of the fastener based on the sensor signals from the non-contact sensor, the second non-contact sensor, and the third non-contact sensor.

4. The method of claim 2, further comprising:
 determining, using the controller, an alignment of the power tool based on the sensor signals from the non-contact sensor, the second non-contact sensor, and the third non-contact sensor.

5. The method of claim 4, further comprising:
 determining, using the controller, whether the alignment of the power tool is indicative of a misalignment of the power tool; and
 generating, using the controller, an output signal operable to provide an indication to a user that the power tool is misaligned.

6. The method of claim 1, further comprising:
 receiving, at the controller, a sensor signal from a pressure sensor; and determining, using the controller, a state of contact between the fastener and a work surface.

7. The method of claim 1, further comprising:

storing, at the controller, the desired fastener depth.

8. The method of claim 1, further comprising:

receiving, at the controller, a temperature signal from a temperature sensor; and determining, using the controller, a speed of sound from the temperature signal to determine the depth of the fastener.

9. A method of controlling a power tool, the power tool including a motor within a power tool housing and a sensor attachment physically coupled to the power tool housing, the sensor attachment including a non-contact sensor, the method comprising:

receiving, at a controller, an input signal wirelessly communicated from a remote user interface;

determining, using the controller, a desired fastener depth based on the input signal;

receiving, at the controller, a sensor signal from a non-contact sensor of the sensor attachment;

determining, using the controller, a depth of a fastener based on the sensor signal received from the non-contact sensor; and generating, using the controller, a control signal when the depth of the fastener is greater than or equal to the desired fastener depth, wherein the control signal is operable to cause power to the motor to be turned off.

10. The method of claim 9, further comprising:

receiving, at the controller, a sensor signal from a second non-contact sensor and a sensor signal from a third non-contact sensor.

11. The method of claim 10, further comprising:

determining, using the controller, the depth of the fastener based on the sensor signals from the non-contact sensor, the second non-contact sensor, and the third non-contact sensor.

12. The method of claim 10, further comprising:

determining, using the controller, an alignment of the power tool based on the sensor signals from the non-contact sensor, the second non-contact sensor, and the third non-contact sensor.

13. The method of claim 12, further comprising:

determining, using the controller, whether the alignment of the power tool is indicative of a misalignment of the power tool; and generating, using the controller, an output signal operable to provide an indication to a user that the power tool is misaligned.

* * * * *